(12) United States Patent
Chang et al.

(10) Patent No.: US 9,781,620 B2
(45) Date of Patent: Oct. 3, 2017

(54) RADIO MEASUREMENT COLLECTION METHOD AND RADIO TERMINAL

(75) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 236 days.

(21) Appl. No.: 13/824,304

(22) PCT Filed: Sep. 21, 2011

(86) PCT No.: PCT/JP2011/071522
§ 371 (c)(1),
(2), (4) Date: Mar. 15, 2013

(87) PCT Pub. No.: WO2012/039440
PCT Pub. Date: Mar. 29, 2012

(65) Prior Publication Data
US 2013/0178224 A1    Jul. 11, 2013

Related U.S. Application Data

(60) Provisional application No. 61/385,079, filed on Sep. 21, 2010.

(51) Int. Cl.
*H04W 24/10* (2009.01)
*H04B 17/309* (2015.01)
*H04W 52/38* (2009.01)
*H04B 17/24* (2015.01)

(52) U.S. Cl.
CPC .......... *H04W 24/10* (2013.01); *H04B 17/309* (2015.01); *H04B 17/24* (2015.01); *H04W 52/38* (2013.01)

(58) Field of Classification Search
CPC .................................................... H04W 24/10
USPC ....................................................... 455/452.1
See application file for complete search history.

(56) References Cited

U.S. PATENT DOCUMENTS 8,391,887 B2 *  3/2013  Suzuki ................... G01S 19/05
                                                      370/252
8,571,542 B2 * 10/2013  Wu ....................... H04W 24/10
                                                      370/241
(Continued)

FOREIGN PATENT DOCUMENTS

CN          1358396 A      7/2002
CN        101617545 A     12/2009
(Continued)

OTHER PUBLICATIONS

Nokia Corporation, Nokia Siemens Networks, "MDT Architecture for Idle Mode Reporting," 3GPP TSG-RAN WG2 Meeting #69, R2-100245, San Francisco, United States, Feb. 22-26, 2010, 5 pages, XP050421727.*

(Continued)

*Primary Examiner* — Asghar Bilgrami
(74) *Attorney, Agent, or Firm* — Studebaker & Brackett PC

(57) ABSTRACT

A radio measurement collection method according to the present invention, comprises the steps of: sending IdleMDTConfiguration message for setting a plurality of measurement triggers from E-UTRAN including a radio base station eNB to a radio terminal UE; setting the plurality of measurement triggers in the radio terminal UE by the radio terminal itself according to the IdleMDTConfiguration message from the E-UTRAN; measuring a radio environment for each of the plurality of measurement triggers by the radio terminal UE in an idle mode; and storing, by the radio terminal UE, each measurement result obtained at the measuring step in association with the measurement trigger corresponding to the measurement result.

12 Claims, 17 Drawing Sheets

(56) References Cited

U.S. PATENT DOCUMENTS

| | | | | |
|---|---|---|---|---|
| 8,594,657 | B2* | 11/2013 | Wu | H04W 24/10 370/331 |
| 8,594,671 | B2* | 11/2013 | Wu | H04W 24/10 370/331 |
| 8,731,543 | B2* | 5/2014 | Jung | H04W 24/10 455/422.1 |
| 2008/0014957 | A1 | 1/2008 | Ore | |
| 2009/0042601 | A1 | 2/2009 | Wang et al. | |
| 2010/0105377 | A1 | 4/2010 | Iwamura et al. | |
| 2010/0142498 | A1 | 6/2010 | Hyounhee | |
| 2010/0208707 | A1* | 8/2010 | Hamabe | H04W 24/10 370/332 |
| 2011/0039517 | A1 | 2/2011 | Wigren et al. | |
| 2011/0183661 | A1* | 7/2011 | Yi | H04W 24/10 455/422.1 |
| 2011/0250880 | A1* | 10/2011 | Olsson | H04W 76/027 455/423 |
| 2013/0143571 | A1 | 6/2013 | Iwamura et al. | |
| 2013/0208617 | A1* | 8/2013 | Fukuta | H04W 24/10 370/252 |
| 2013/0331104 | A1 | 12/2013 | Iwamura et al. | |

FOREIGN PATENT DOCUMENTS

| | | |
|---|---|---|
| CN | 101808358 A | 8/2010 |
| JP | 11-284561 | 10/1999 |
| JP | 2002-543722 A | 12/2002 |
| JP | 2008-172380 A | 7/2008 |
| JP | 2010-193456 A | 9/2010 |
| WO | 00/67507 A1 | 11/2000 |
| WO | 2009/134174 A1 | 11/2009 |

OTHER PUBLICATIONS

3GPP TR 36.805 V9.0.0 (Dec. 2009); 3rd Generation Partnership Project; Technical Specification Group Radio Access Network; Study on Minimization of drive-tests in Next Generation Networks; (Release 9).

3GPP TS 37.320 V0.7.0 (Jun. 2010); 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

International Search Report; PCT/JP2011/071522; dated Nov. 29, 2011.

The first Office Action issued by the State Intellectual Property Office of China on Feb. 28, 2014, which corresponds to Chinese Patent Application No. 201180045431.4 and is related to U.S. Appl. No. 13/824,304; with English language concise explanation.

An Office Action; "Notice of Reasons for Rejection," issued by the Japanese Patent Office dated Mar. 11, 2014, which corresponds to Japanese Patent Application No. 2012-535058 and is related to U.S. Patent Application No. 13/824,304; with English language statement of relevance.

An Office Action issued by the Korean Patent Office on Jun. 26, 2014, which corresponds to Korean Patent Application No. 10-2013-7009382 and is related to U.S. Appl. No. 13/824,304; with English language concise explanation.

3GPP; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; 3GPP TS 37.320; V1.0.0; Aug. 2010.

Qualcomm Incorporated; "InterRAT MDT handling"; 3GPP TSG-RAN WG2 Meeting #70bis; R2-103815; Stockholm, Sweden; Jun. 28-Jul. 2, 2010.

The extended European search report issued by the European Patent Office on Mar. 22, 2017, which corresponds to European Patent Application No. 11826885.3-1854 and is related to U.S. Appl. No. 13/824,304.

NTT DOCOMO, Inc.; "Re-configurability of logged MDT measurements"; 3GPP TSG-RAN2#70; R2-102906; pp. 1-5; May 10-14, 2010; Montreal, Canada.

* cited by examiner

FIG. 5

| TRIGGER IDENTIFIER #1 (MEASUREMENT TRIGGER #1) | (MEASUREMENT RECORD #1) MEASUREMENT RESULT LOCATION INFORMATION TIMESTAMP |
|---|---|
| TRIGGER IDENTIFIER #1 (MEASUREMENT TRIGGER #1) | (MEASUREMENT RECORD #2) MEASUREMENT RESULT LOCATION INFORMATION TIMESTAMP |
| TRIGGER IDENTIFIER #2 (MEASUREMENT TRIGGER #2) | (MEASUREMENT RECORD #3) MEASUREMENT RESULT LOCATION INFORMATION TIMESTAMP |
| TRIGGER IDENTIFIER #1 (MEASUREMENT TRIGGER #1) | (MEASUREMENT RECORD #4) MEASUREMENT RESULT LOCATION INFORMATION TIMESTAMP |

↓ NEW

FIG. 12

| RAT IDENTIFIER #1 (MEASUREMENT TARGET RAT #1) | (MEASUREMENT RECORD #1) MEASUREMENT RESULT LOCATION INFORMATION TIMESTAMP |
|---|---|
| RAT IDENTIFIER #1 (MEASUREMENT TARGET RAT #1) | (MEASUREMENT RECORD #2) MEASUREMENT RESULT LOCATION INFORMATION TIMESTAMP |
| RAT IDENTIFIER #2 (MEASUREMENT TARGET RAT #2) | (MEASUREMENT RECORD #3) MEASUREMENT RESULT LOCATION INFORMATION TIMESTAMP |
| RAT IDENTIFIER #1 (MEASUREMENT TARGET RAT #1) | (MEASUREMENT RECORD #4) MEASUREMENT RESULT LOCATION INFORMATION TIMESTAMP |

↓ NEW

RADIO MEASUREMENT COLLECTION METHOD AND RADIO TERMINAL

TECHNICAL FIELD

The present invention relates to a radio measurement collection method and a radio terminal to measure and collect a radio environment.

BACKGROUND ART

In a mobile communication system, the radio environment of a radio base station changes when a building is constructed around of the radio base station or the installation conditions of neighboring base stations of the radio base station change. For this reason, operators have been heretofore conducting drive tests by measuring and correcting radio environments by use of a measurement vehicle equipped with measurement equipment.

Such measurement and collection of the radio environments can contribute to optimization of parameters of a radio base station or the like, but have problems of requiring a large number of man-hours and high cost. For this reason, the 3GPP (3rd Generation Partnership Project) that is the standardization project of a mobile communication system has been developing the specifications of MDT (Minimization of Drive Test) (see, 3GPP TR 36.805 V9.0.0 "Study on Minimization of drive-tests in Next Generation Networks", 2009-12 and 3GPP TS 37.320 v0.7.0, "Radio measurement collection for Minimization of Drive Tests (MDT)", 2010-07). The MDT is a technology in which the measurement and collection of the radio environments are automated using radio terminals held by users.

One type of MDT, that is, a log-type MDT (referred to as a Logged MDT) is assumed to measure and collect a radio environment in the following methods. Firstly, a network including a radio base station sends a radio terminal a measurement configuration message for setting a measurement configuration. The measurement configuration contains a measurement trigger and the like. Then, the radio terminal in an idle mode (in other words, in a stand-by mode) measures a radio environment in accordance with the measurement configuration set by the measurement configuration message received from the network, and stores the measurement result.

SUMMARY OF THE INVENTION

In the current specifications of the logged MDT, it is not assumed that plural measurement configurations are simultaneously set in a same radio terminal. However, in occasions such as initial phases of services of a radio communication system, for example, various measurement results are desired to be obtained in a short period of time. The current specifications of the logged MDT, however, allow settings of only one trigger for measurement (hereinafter, a measurement trigger) and one radio access technology targeted for measurement (hereinafter, a measurement target RAT). Thus, it is difficult to obtain various measurement results in a short period of time.

Against this background, the present invention provides a radio measurement collection method and radio terminal capable of obtaining various measurement results in a short period of time.

The feature of a radio measurement collection method according to the present invention is summarized as follows. A radio measurement collection method, comprises the steps of: sending a measurement configuration message (e.g., IdleMDT Configuration message) for setting a plurality of measurement triggers from a network (e.g., E-UTRAN) including a radio base station to a radio terminal (radio terminal UE); setting the plurality of measurement triggers in the radio terminal by the radio terminal itself according to the measurement configuration message from the network; measuring a radio environment for each of the plurality of measurement triggers by the radio terminal in an idle mode; and storing, by the radio terminal, each measurement result obtained at the measuring step in association with the measurement trigger corresponding to the measurement result.

According to the above-described features, the plural measurement triggers can be simultaneously set for a same radio terminal and the measurement results can be classified and stored by measurement trigger. Thus, the various measurement results classified by measurement trigger can be obtained in a short period of time.

Other feature of a radio measurement collection method according to the present invention relates to the radio measurement collection method according to aforementioned feature and is summarized as follows. The radio measurement collection method further comprises the step of reserving a storage area for each of the plurality of measurement triggers, wherein in the storing step, the measurement result is stored in a corresponding storage area.

Other feature of a radio measurement collection method according to the present invention relates to the radio measurement collection method according to aforementioned feature and is summarized as follows. The storing step includes the step of adding a trigger identifier to each measurement result, the trigger identifier indicating the measurement trigger corresponding to the measurement result.

Other feature of a radio measurement collection method according to the present invention relates to the radio measurement collection method according to aforementioned feature and is summarized as follows. When a plurality of measurement results are obtained for one measurement trigger of the plurality of measurement trigger, the storing step includes the step of adding an trigger identifier indicating the one measurement trigger to each of the plurality of measurement results.

Other feature of a radio measurement collection method according to the present invention relates to the radio measurement collection method according to aforementioned feature and is summarized as follows. The radio measurement collection method further comprises the steps of: sending a request message (e.g., UEInformationRequest message) requesting transmission of the measurement result from the network to the radio terminal after the radio terminal transfers from an idle mode to a connected mode; and sending the measurement result and a trigger identifier from the radio terminal to the network in response to the request message from the network, the trigger identifier indicating a measurement trigger corresponding to the measurement result.

Other feature of a radio measurement collection method according to the present invention relates to the radio measurement collection method according to aforementioned feature and is summarized as follows. The radio measurement collection method further comprises the step of sending, from the radio terminal to the network, information (e.g., AVAILABILITY INDICATOR) indicating that the measurement result is stored and a trigger identifier indicating a measurement trigger corresponding to the measurement result, when the radio terminal transfers from an idle mode to a connected mode.

Other feature of a radio measurement collection method according to the present invention relates to the radio measurement collection method according to aforementioned feature and is summarized as follows. The radio measurement collection method further comprises the steps of: sending a request message (e.g., UEInformationRequest message) containing a trigger identifier indicating a measurement trigger from the network to the radio terminal, after the radio terminal transfers from an idle mode to a connected mode; and sending, from the radio terminal to the network, a measurement result obtained for the trigger identifier contained in the request message from the network.

The feature of a radio terminal according to the present invention is summarized as follows. A radio terminal, comprises: a storage unit (storage unit 250); a radio communication unit (radio communication unit 210) configured to perform a radio communication with a radio base station; and a controller (controller 260) configured to control the storage unit and the radio communication unit, wherein when the radio communication unit receives a measurement configuration message (e.g., IdleMDTConfiguration message) for setting a plurality of measurement triggers, the controller sets the plurality of measurement triggers according to the received measurement configuration message, in an idle mode, the controller measures a radio environment for each of the plurality of set measurement triggers, and the controller stores a measurement result obtained by the measurement in association with a measurement trigger corresponding to the measurement result.

The feature of a radio measurement collection method according to the present invention is summarized as follows. A radio measurement collection method, comprises the steps of: sending information indicating a measurement configuration for a radio terminal from a network; measuring a radio environment for a radio access technology (RAT) corresponding to the measurement configuration from the network and another RAT by the radio terminal in an idle mode; and storing, by the radio terminal, a measurement result obtained at the measuring step for each of a plurality of RATs.

Other feature of a radio measurement collection method according to the present invention relates to the radio measurement collection method according to aforementioned feature and is summarized as follows. The radio measurement collection method further comprises the step of reserving a storage area for each of the plurality of RATs, wherein in the storing step, the measurement result is stored in a corresponding storage area.

Other feature of a radio measurement collection method according to the present invention relates to the radio measurement collection method according to aforementioned feature and is summarized as follows. The storing step includes the step of adding a RAT identifier to each measurement result, the RAT identifier indicating a RAT corresponding to the measurement result.

Other feature of a radio measurement collection method according to the present invention relates to the radio measurement collection method according to aforementioned feature and is summarized as follows. When a plurality of measurement results are obtained for one RAT of the plurality of RATs, the storing step includes the step of adding one RAT identifier indicating the one RAT to each of the plurality of measurement results.

Other feature of a radio measurement collection method according to the present invention relates to the radio measurement collection method according to aforementioned feature and is summarized as follows. The radio measurement collection method further comprises the steps of: sending a request message (UEInformationRequest message) requesting transmission of the measurement result from the network to the radio terminal after the radio terminal transfers from an idle mode to a connected mode; and sending the measurement result and a RAT identifier from the radio terminal to the network in response to the request message from the network, the RAT identifier indicating a RAT corresponding to the measurement result.

Other feature of a radio measurement collection method according to the present invention relates to the radio measurement collection method according to aforementioned feature and is summarized as follows. The radio measurement collection method further comprises the step of sending, from the radio terminal to the network, information (e.g., AVAILABILITY INDICATOR) indicating that a measurement result is stored and a RAT identifier indicating a RAT corresponding to the measurement result, when the radio terminal transfers from an idle mode to a connected mode.

Other feature of a radio measurement collection method according to the present invention relates to the radio measurement collection method according to aforementioned feature and is summarized as follows. The radio measurement collection method further comprises the step of sending, from the radio terminal to the network, information (e.g., AVAILABILITY INDICATOR) indicating that the measurement result is stored for each of the plurality of RATs, when the radio terminal transfers from an idle mode to a connected mode.

Other feature of a radio measurement collection method according to the present invention relates to the radio measurement collection method according to aforementioned feature and is summarized as follows. The radio measurement collection method further comprises the steps of: sending a request message (UEInformationRequest message) containing a RAT identifier indicating a RAT from the network to the radio terminal, after the radio terminal transfers from an idle mode to a connected mode; and sending, from the radio terminal to the network, the measurement result corresponding to the RAT identifier contained in the request message from the network.

Other feature of a radio terminal according to the present invention is summarized as follows. A radio terminal, comprises: a storage unit (storage unit 250); a radio communication unit (radio communication unit 210) configured to perform a radio communication with a radio base station; and a controller (controller 260) configured to control the storage unit and the radio communication unit, wherein when the radio communication unit receives a measurement configuration message for setting a measurement configuration, the controller sets the measurement configuration according to the received measurement configuration message, in an idle mode, the controller measures a radio environment for each of a plurality of RATs according to the measurement configuration, and the controller stores each measurement result obtained by the measurement in association with the RAT corresponding to the measurement result.

The feature of a radio measurement collection method according to the present invention is summarized as follows. A radio measurement collection method, comprises the steps of: sending information indicating a measurement configuration for a radio terminal from a network; measuring a radio environment for a radio access technology (RAT) corresponding to the measurement configuration from the network and another RAT by the radio terminal in an idle mode; sending a request message requesting transmission of the measurement result from the network to the radio terminal; and sending the measurement result obtained for each of the plurality of RATs and a RAT identifier for each of the plurality of RATs from the radio terminal to the network in response to the request message from the network.

The feature of a radio terminal according to the present invention is summarized as follows. A radio terminal, comprises: a storage unit; a radio communication unit configured to perform a radio communication with a radio base station; and a controller configured to control the storage unit and the radio communication unit, wherein when the radio communication unit receives information indicating a measurement configuration from a network, in an idle mode, the controller measures a radio environment for a radio access technology corresponding to the measurement configuration and another RAT, and sends the measurement result obtained for each of the plurality of RATs and a RAT identifier for each of the plurality of RATs to the network in response to the request message from the network.

BRIEF DESCRIPTION OF THE DRAWINGS

FIG. 5 is a conceptual diagram for illustrating a storing method 2 according to the first embodiment.

FIG. 12 is a conceptual diagram for illustrating a storing method 2 according to the second embodiment.

DESCRIPTION OF THE EMBODIMENTS

Figure 1:
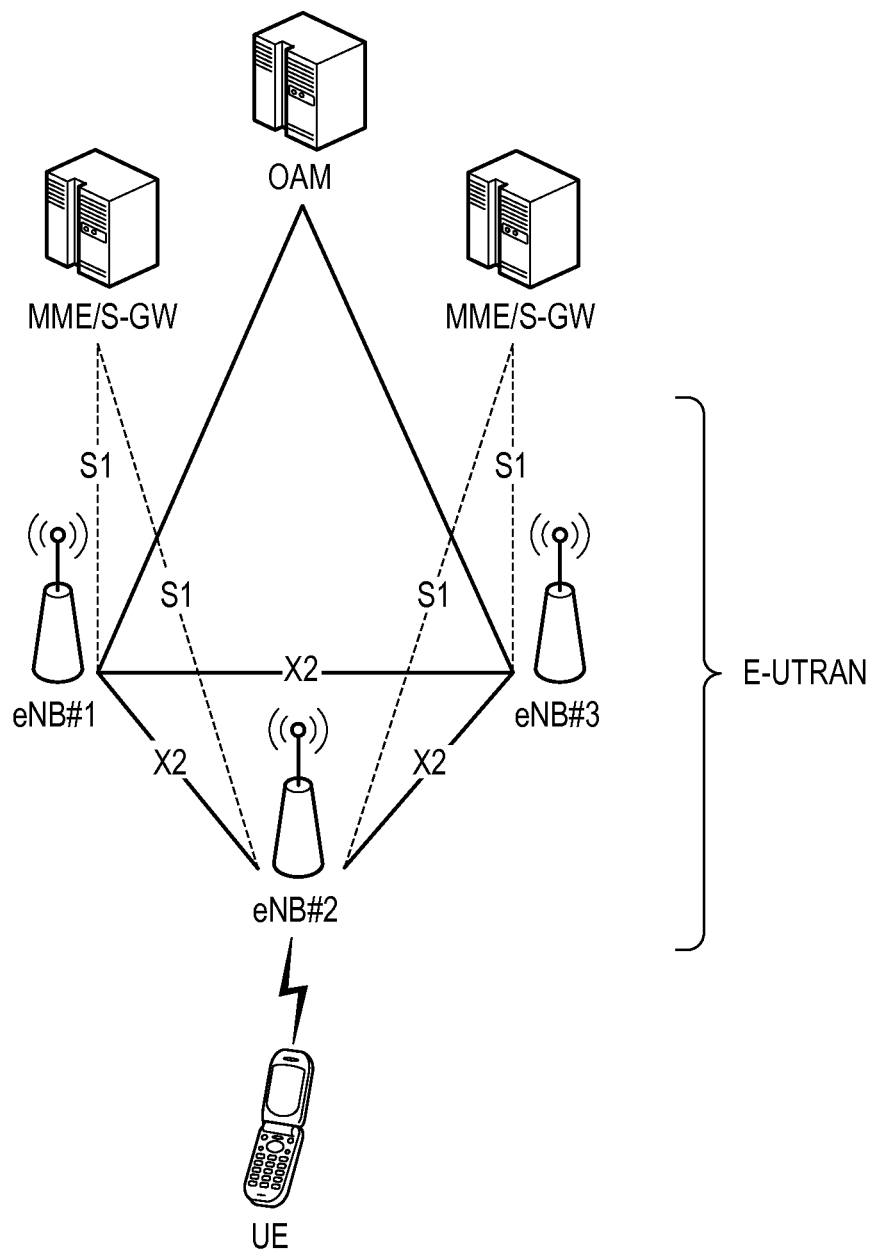
FIG. 1 is a drawing generally showing a schematic configuration of a mobile communication system according to a first embodiment.

With reference to the drawings, first, second, and other embodiments of the present invention are described. In the drawings of the embodiments, same or similar portions are given same or similar reference symbols.

(1) First Embodiment

The first embodiment is described in terms of: (1.1) Outline of Mobile Communication System, (1.2) Configuration of Radio Base Station, (1.3) Configuration of Radio Terminal, (1.4) Radio Measurement Collection Method, (1.5) Effects of First Embodiment, (1.6) Modification 1 of First Embodiment, (1.7) Modification 2 of First Embodiment, and (1.8) Modification 3 of First Embodiment.

(1.1) Outline of Mobile Communication System

FIG. 1 is a drawing generally showing a schematic configuration of a mobile communication system 1 according to a first embodiment.

As shown in FIG. 1, the mobile communication system 1 has a radio terminal UE (User Equipment), plural radio base stations eNB (evolved Node-B), a maintenance and monitoring device OAM (Operation and Maintenance), and plural mobility management devices MME (Mobility Management Entity)/gateway devices S-GW (Serving Gateway).

The plural radio base stations eNB (eNB#1 to eNB#3) forms E-UTRAN (Evolved-UMTS Terrestrial Radio Access Network). Each radio base station eNB forms a cell which is a communication area to provide the radio terminal UE with a service. The radio terminal UE is a radio communication device held by a user and also referred to as user equipment.

The neighboring radio base stations eNB can communicate with one another via an X2 interface which is a logical communication path to provide communications between base stations. Each of the plural radio base stations eNB can communicate with EPC (Evolved Packet Core), specifically, MME (Mobility Management Entity)/S-GW (Serving Gateway) via an S1 interface. Also, each radio base station eNB can communicate with the maintenance and monitoring device OAM which is operated by an operator.

Note that in the following description, the E-UTRAN and the maintenance and monitoring device OAM are collectively referred to as a "network" when needed. However, the "network" may include a radio access network based on a different radio access technology (RAT).

The mobile communication system 1 supports a log type MDT (referred to as a Logged MDT). In the Logged MDT, a radio terminal UE in an idle mode performs measurement when satisfying a set condition, and stores MDT data containing a measurement result so as to report it to the network later. The Logged MDT measures and collects a radio environment in the following methods.

Firstly, the network sends an IdleMDTConfiguration message which is a measurement configuration message for setting a measurement configuration to a radio terminal UE in a connected mode. The measurement configuration contains a measurement target (measurements to be logged), a measurement trigger (triggering of logging event), a measurement duration (total duration of logging), an absolute time (network absolute time stamp), and a measurement area (measurements area). However, the measurement area (measurements area) does not necessarily have to be contained in the measurement configuration. Note that the measurement configuration is sometimes referred to as an MDT configuration.

The measurement target is, for example, a frequency band targeted for measurement. In the E-UTRAN, the radio terminal UE measures a reference signal received power (RSRP) and a reference signal received quality (RSRQ) of the frequency band targeted for measurement.

The measurement trigger is, for example, a periodic measurement trigger for downlink pilot signal strength, and a measurement interval can be set on a periodic basis. The radio terminal UE performs measurement according to the set measurement interval.

However, Instead of the above periodic measurement trigger, at least one of measurement triggers to be described below can be set. Here, the outline of each measurement trigger is described, but, for details, please refer to the 3GPP TR 36.805 V9.0.0, "Study on Minimization of drive-tests in Next Generation Networks".

A radio environment of a serving cell becomes worse than a threshold. This trigger type is suitable for optimizing the coverage, specifically, for identifying a location where a downlink failure occurs.

A transmit power headroom of a radio terminal becomes less than a threshold. This trigger type is suitable for observing an uplink transmit power level or identifying a location where an uplink budget is insufficient.

Random access failure. This trigger type is suitable for identifying a cause of the random access failure.

Failure in decoding of a paging channel. This trigger type is suitable for grasping if reliable paging information is delivered to a radio terminal in an idle mode.

Failure in decoding of a broadcast channel. This trigger type is suitable for identifying a radio environment or a location where the radio terminal in an idle mode could not camp on (be stand-by).

Two or more of these measurement triggers are simultaneously set in the radio terminal UE, in other words, plural measurement configurations for the plural measurement triggers are simultaneously set in the radio terminal UE, so that various measurement results suitable for various purposes can be simultaneously obtained.

Here, the measurement duration is to set the duration of logged MDT and an absolute time is to set a reference for the radio terminal UE to create time information (time stamp).

Secondly, when an event corresponding to the set measurement trigger occurs while the radio terminal UE is in an idle mode during the measurement duration, the radio terminal UE measures a radio environment according to an IdleMDTConfiguration message and stores MDT data containing a measurement result. The radio terminal UE activates a timer for a measurement duration when the measurement configuration is set by the IdleMDTConfiguration message, and terminates the storing of the MDT data when the timer expires. Note that the radio environment is, for example, RSRP or RSRQ. Also, the MDT data includes location information and a time stamp (time information) in addition to the measurement result. The location information includes ECGI (E-UTRAN Cell Global Identifier) of a serving cell. Also, when the radio terminal UE includes a positioning function, the location information further contains GNSS (Global Navigation Satellite System) location information. On the other hand, when the radio terminal UE does not have the positioning function, the location information further contains an RF (Radio frequency) fingerprint about a receiving condition from a neighboring cell.

Thirdly, when the radio terminal UE transfers from an idle mode (an RRC idle mode) to a connected mode (an RRC connected mode), the radio terminal UE sends log-holding information (referred to as Availability Indicator) showing that the MDT data is held to the network. Specifically, the radio terminal UE sends the log-holding information with being contained in an RRCConnectionSetupComplete message showing that the setting of the connected mode has been completed to the network.

Fourthly, the network sends a UEInformationRequest message which is a request message for requesting the reporting of the MDT data to the radio terminal UE. When receiving the UEInformationRequest message, the radio terminal UE sends a UEinformationResponse message containing the held MDT data to the network.

(1.2) Configuration of Radio Base Station

Figure 2:
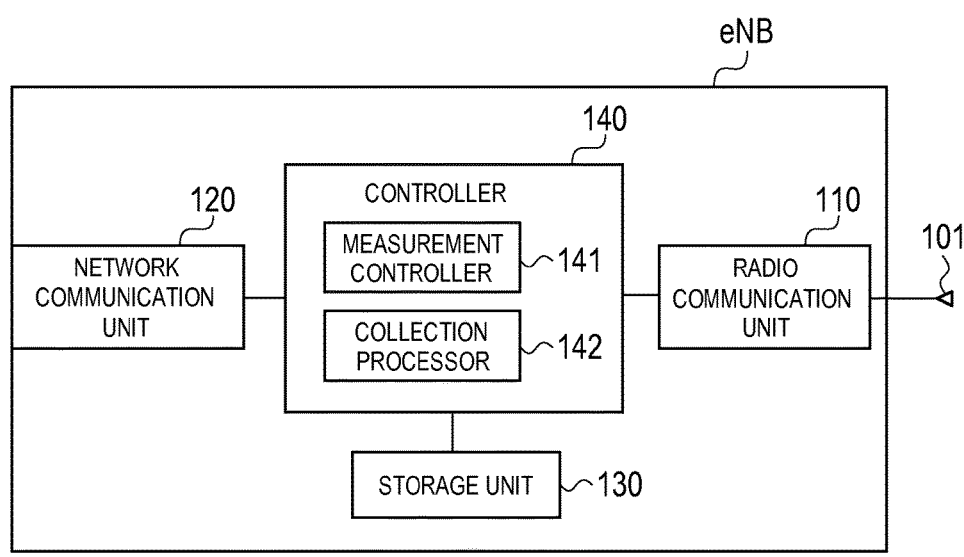
FIG. 2 is a block diagram showing a configuration of a radio base station according to the first embodiment and a second embodiment.

FIG. 2 is a block diagram showing a configuration of the radio base station eNB.

As shown in FIG. 2, the radio base station eNB has an antenna 101, a radio communication unit 110, a network communication unit 120, a storage unit 130, and a controller 140.

The antenna 101 is used for transmission and reception of a radio signal. The radio communication unit 110 is configured using, for example, a radio frequency (RF) circuit and a baseband (BB) circuit, and sends/receives a radio signal via the antenna 101. Also, the radio communication unit 110 modulates a transmission signal and demodulates a receiving signal. The network communication unit 120 communicates with other network devices (such as the maintenance and monitoring device OAM and other radio base stations eNB). The storage unit 130 is configured using, for example, a memory, and stores various pieces of information which is used for control of the radio base station eNB or the like. The controller 140 is configured using, for example, a CPU and controls various functions included in the radio base station eNB.

The controller 140 has a measurement controller 141 and a collection processor 142.

The measurement controller 141 creates an IdleMDTConfiguration message containing a measurement configuration (a measurement target, a measurement trigger, a measurement duration, an absolute time, and a measurement area) when it is determined that the measurement configuration is set in a radio terminal UE (selected by the network). In the first embodiment, the measurement controller 141 crates an IdleMDTConfiguration message containing plural measurement configurations for plural measurement triggers. Then, the measurement controller 141 takes control to cause the radio communication unit 110 to send the IdleMDTConfiguration message to the radio terminal UE.

The collection processor 142 collects MDT data from the radio terminal UE. Specifically, when it is determined (by the network) after the radio communication unit 110 receives the RRCConnectionSetupComplete message containing the log-holding information (Availability Indicator) that the MDT data is collected from the radio terminal UE, the collection processor 142 creates a UEInformationRequest message, and takes control to cause the radio communication unit 110 to send the created UEInformationRequest message to the radio terminal UE. When the radio communication unit 110 receives the UEInformationResponse message sent (reported) from the radio terminal UE in response to the UEInformationRequest message, the collection processor 142 acquires the MDT data contained in the received UEInformationResponse message.

After that, the collection processor 142 takes control to cause the network communication unit 120 to send the acquired MDT data to the maintenance and monitoring device OAM. Note that the collection processor 142 may not only send the MDT data to the maintenance and monitoring device OAM but also interpret and use the contents of the log data for optimizing parameters of the own radio base station.

(1.3) Configuration of Radio Terminal

Figure 3:
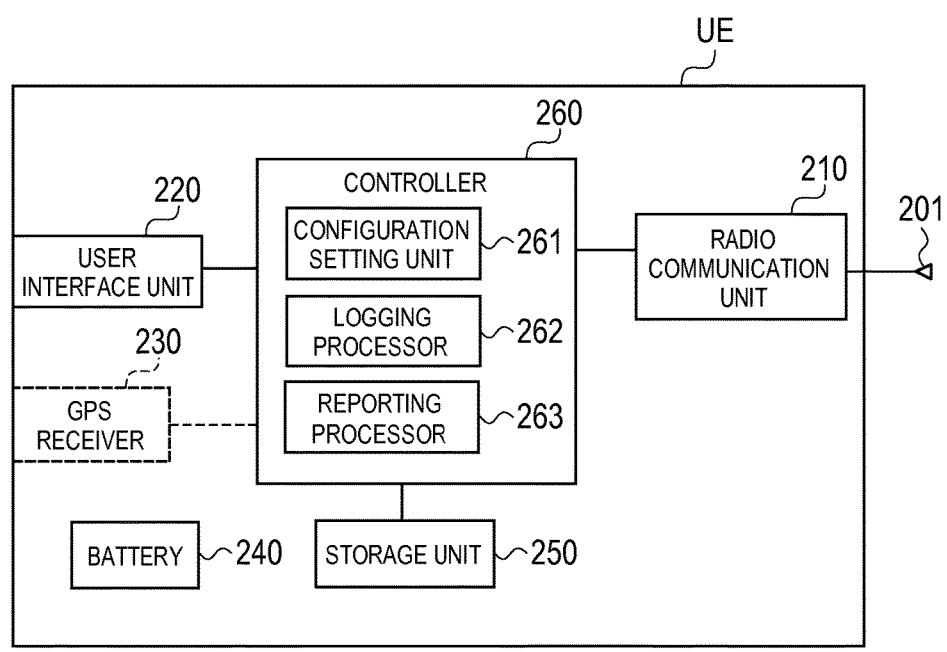
FIG. 3 is a block diagram showing a configuration of a radio terminal according to the first embodiment and the second embodiment.

FIG. 3 is a block diagram showing a configuration of the radio terminal UE.

As shown in FIG. 3, the radio terminal UE has an antenna 201, a radio communication unit 210, a user interface unit 220, a GPS receiver 230, a battery 240, a storage unit 250, and a controller 260. However, it is not necessary that the radio terminal UE has the GPS receiver 230.

The antenna 201 is used for transmission and reception of a radio signal. The radio communication unit 210 is configured using, for example, a radio frequency (RF) circuit or a baseband (BB) circuit, and sends/receives a radio signal via the antenna 201. Also, the radio communication unit 210 modulates a transmission signal and demodulates a receiving signal. The user interface unit 220 is a display or a button to function as an interface with a user. The battery 240 stores power which is supplied to each block of the radio terminal UE. The storage unit 250 is configured using, for example, a memory, and stores various pieces of information which is used for control of the radio terminal UE. The controller 260 is configured using, for example, a CPU and controls various kinds of functions included in the radio terminal UE.

The controller 260 has a configuration setting unit 261, a logging processor 262, and a reporting processor 263.

When the radio communication unit 210 receives the IdleMDTConfiguration message, the configuration setting unit 261 sets the measurement configuration contained in the received IdleMDTConfiguration message (in other words, stores in the storage unit 250) in the connected mode. Also, the configuration setting unit 261 activates a timer for a measurement duration (a duration timer) when the measurement configuration is set.

In the first embodiment, when the radio communication unit 210 receives the IdleMDTConfiguration message containing the plural measurement configurations for the plural measurement triggers, the configuration setting unit 261 sets the plural measurement configurations contained in the received IdleMDTConfiguration message (in other words, stores in the storage unit 250).

The logging processor 262 measures a radio environment, acquires location information and time information (time stamp) for each measurement configuration stored in the storage unit 250, and stores the MDT data containing the measurement result, the location information, and the time stamp (in other words, stores in the storage unit 250). In the first embodiment, the logging processor 262 performs measurement for a frequency band designated by the measurement target (measurements to be logged) every time an event corresponding to each of the plural measurement triggers (triggering of logging event) occurs.

The logging processor 262 measures a radio environment for each of the plural measurement triggers and stores the measurement result in association with the measurement trigger corresponding to the measurement result according to any of the following storing methods 1 to 3. In the following description, a set of the measurement result obtained by one time measurement and the location information and the time stamp when the measurement is conducted is referred to as a "measurement record". The MDT data is a collection of plural measurement records.

Figure 4:
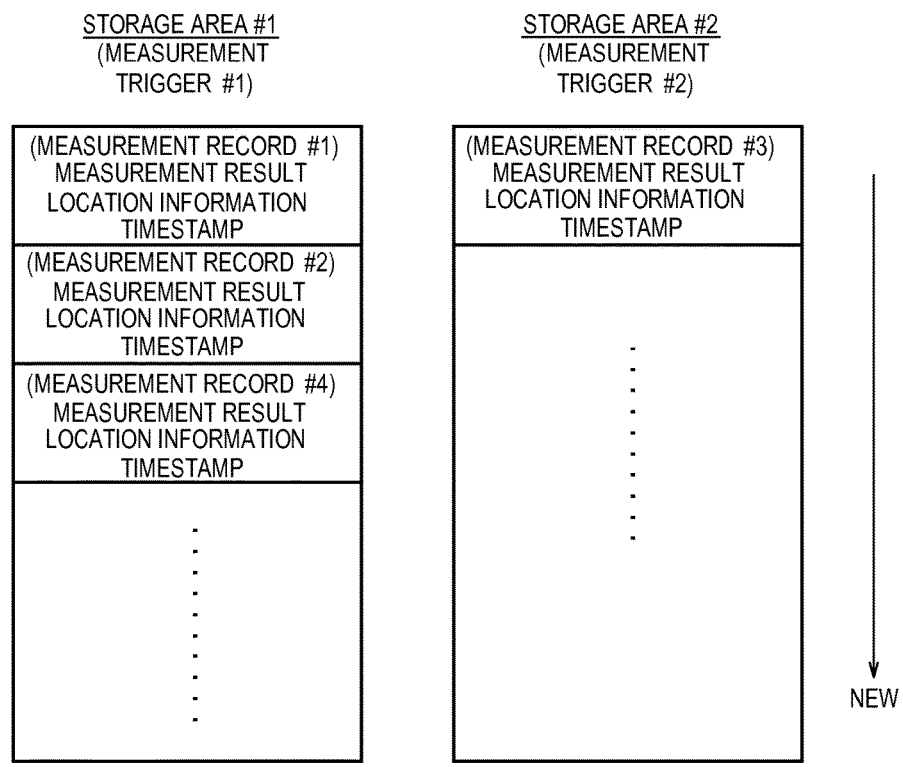
FIG. 4 is a conceptual diagram for illustrating a storing method 1 according to the first embodiment.

FIG. 4 is a conceptual diagram for illustrating a storing method 1 according to the first embodiment.

As shown in FIG. 4, the logging processor 262 reserves a storage area inside the storage unit 250 for each of the plural measurement triggers. Specifically, the logging processor 262 reserves a storage area #1 for a measurement trigger #1 and reserves a storage area #2 for a measurement trigger #2.

Then, when the measurement is conducted at the time of occurrence of the event corresponding to the measurement trigger #1, the logging processor 262 stores the measurement record containing the measurement result, the location information, and the time stamp in the storage area #1. In FIG. 4, the logging processor 262 stores a measurement record #1, a measurement record #2, and a measurement record #4 for the measurement trigger #1 in the storage area #1.

Also, when the measurement is conducted at the time of occurrence of the event corresponding to the measurement trigger #2, the logging processor 262 stores a measurement record containing the measurement result, the location information, and the time stamp in the storage area #2. In FIG. 4, the logging processor 262 stores a measurement record #3 for the measurement trigger #2 in the storage area #2.

FIG. 5 is a conceptual diagram for illustrating a storing method 2 according to the first embodiment.

As shown in FIG. 5, the logging processor 262 reserves a same storage area for plural measurement triggers and adds a trigger identifier indicating a measurement trigger to each measurement record as a header.

In FIG. 5, the logging processor 262 adds a trigger identifier #1 showing the measurement trigger #1 to each of the measurement record #1, the measurement record #2, and the measurement record #4 obtained for the measurement trigger #1 as a header. Also, the logging processor 262 adds a trigger identifier #2 showing the measurement trigger #2 to the measurement record #3 obtained for the measurement trigger #2 as a header.

Figure 6:
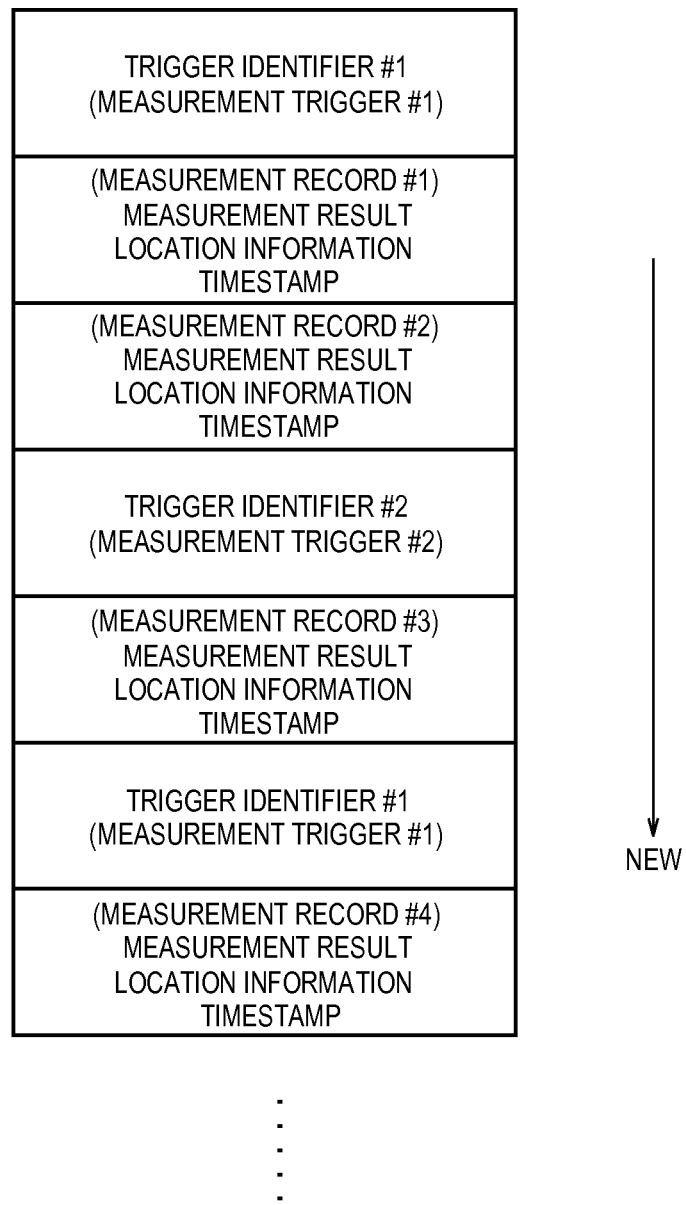
FIG. 6 is a conceptual diagram for illustrating a storing method 3 according to the first embodiment.

FIG. 6 is a conceptual diagram for illustrating a storing method 3 according to the first embodiment.

As shown in FIG. 6, the logging processor 262 reserves a single storage area for plural measurement triggers and adds one trigger identifier indicating the measurement trigger to plural measurement records. Specifically, when the measurement records obtained for one and the same measurement trigger are continuously obtained, the logging processor 262 adds one trigger identifier to the continuous measurement records. After that, the logging processor 262 inserts another trigger identifier between the measurement records when the measurement record for a different measurement trigger is obtained.

In FIG. 6, the logging processor 262 adds the trigger identifier #1 indicating the measurement trigger #1 before the measurement record #1 when the measurement record #1 for the measurement trigger 1 is obtained. After that, the logging processor 262 stores the measurement record #2 after the measurement record #1 when the measurement record #2 for the measurement trigger #1 is obtained.

Thereafter, when the measurement record #3 for the measurement trigger #2 is obtained, the trigger identifier #2 indicating the measurement trigger #2 is inserted between the measurement record #2 and the measurement record #3. After that, when the measurement record #4 for the measurement trigger #1 is obtained, the trigger identifier #1 indicating the measurement trigger #1 is inserted between the measurement record #3 and the measurement record #4.

Returning to FIG. 3 again, the configuration setting unit 261 performs measurement only when camping (being stand-by) in a designated cell ID or a tracking area in a case where a measurement area is designated. Also, the logging processor 262 terminates the storing of the MDT data when the timer for a measurement duration (duration timer) expires.

Note that when the timer for a measurement duration (duration timer) expires, the configuration setting unit 261 deletes the measurement configuration. Furthermore, when a new measurement configuration is set by receiving a new measurement configuration message from the network while the measurement configuration and the MDT data are held, the configuration setting unit 261 replaces the measurement configuration with the new measurement configuration and erases the held MDT data.

While the MDT data is held in the storage unit 259 and an idle mode is transferred to a connected mode, the reporting processor 263 takes control to cause the radio communication unit 210 to send an RRCConnectionSetupComplete message containing log-holding information indicating that the MDT data is held, the RRCConnectionSetupComplete message indicating the completion of the transfer from the idle mode to the connected mode. However, the reporting processor 263 takes control to keep the radio communication unit 210 from sending the log holding information for a RAT different from the RAT for which the measurement configuration is set.

When the radio communication unit 210 receives a UEInformationRequest message, the reporting processor 263 acquires the MDT data from the storage unit 250 and creates a UEInformationResponse message containing the acquired MDT data in the connected mode. Here, the MDT data is classified by measurement trigger by the foregoing storing methods 1 to 3. Specifically, a trigger identifier is added to the measurement record contained in the MDT data.

Then, the reporting processor 263 takes control to cause the radio communication unit 210 to send the created UEInformationResponse message to the network (the radio base station eNB). In this manner, the MDT data is reported to the network, and then the reporting processor 263 erases the MDT data stored in the storage unit 250.

(1.4) Radio Measurement Collection Method

Figure 7:
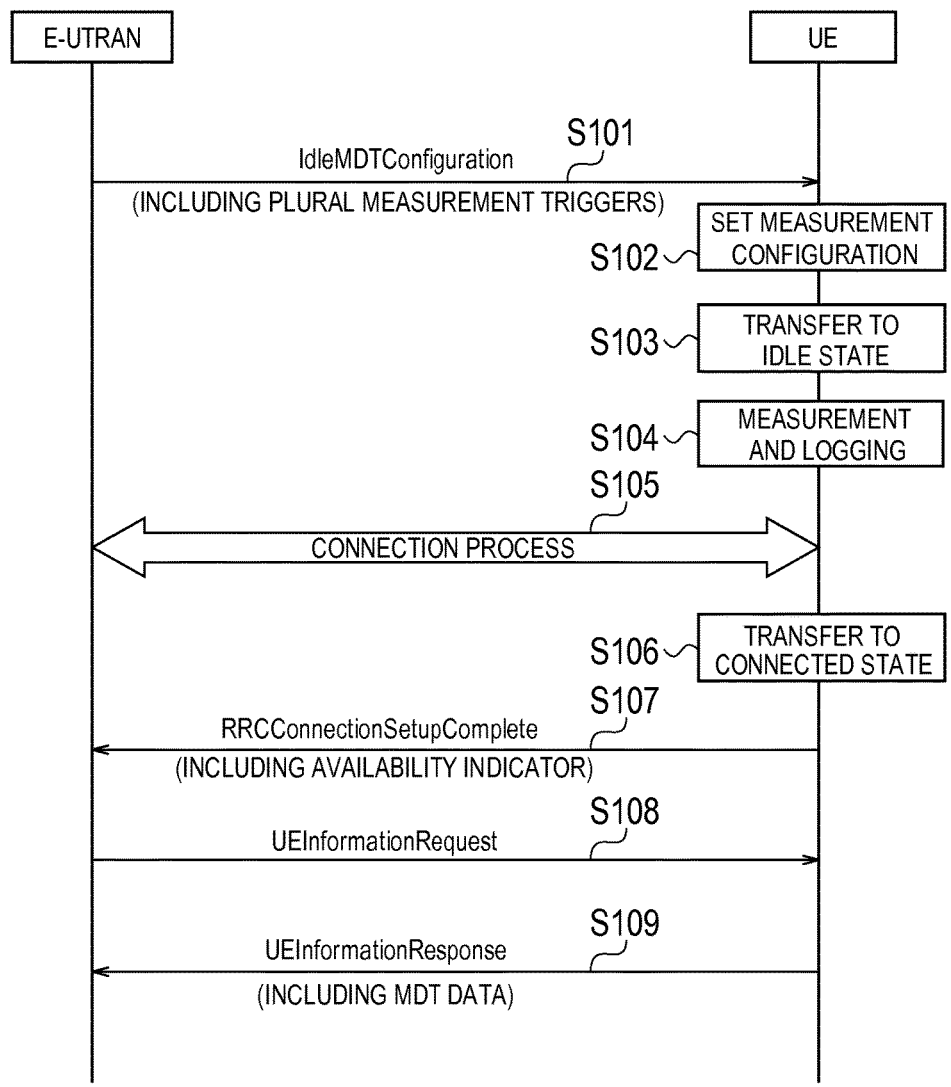
FIG. 7 is a sequence diagram showing a radio measurement collection method according to the first embodiment.

FIG. 7 is a sequence diagram showing a radio measurement collection method according to the first embodiment.

As shown in FIG. 7, at step S101, a radio base station eNB included in E-UTRAN sends an IdleMDTConfiguration message containing plural measurement configurations for plural measurement triggers to a radio terminal UE in a connected mode. The radio terminal UE receives the IdleMDTConfiguration message.

At step S102, the radio terminal UE sets the plural measurement configurations, contained in the received IdleMDTConfiguration message, in the radio terminal UE itself.

At step S103, the radio terminal UE transfers from the connected mode to the idle mode.

At step S104, the radio terminal UE measures a radio environment for each of the plural measurement configurations (in other words, the plural measurement triggers) and stores the measurement record containing the measurement result in association with the measurement trigger according to one of the foregoing storing methods 1 to 3.

At step S105, the radio terminal UE connects with the radio base station eNB included in the E-UTRAN. Note that the radio base station eNB which becomes a connection destination is likely to differ from a base station on a transmission source of the IdleMDTConfiguration message.

At step S106, the radio terminal UE transfers from the idle mode to the connected mode.

At step S107, the radio terminal UE sends an RRCConnectionSetupComplete message containing log-holding information (Availability Indicator) to the radio base station eNB. The radio base station eNB receives the RRCConnectionSetupComplete message.

At step S108, when the MDT data is collected from the radio terminal UE, the radio base station eNB sends the UEInformationRequest message to the radio terminal UE. The radio terminal UE receives the UEInformationRequest message.

At step S109, the radio terminal UE sends a UEInformationResponse message containing the MDT data to the radio base station eNB. Here, the MDT data is classified by measurement trigger in any of the foregoing storing methods 1 to 3. Specifically, a trigger identifier is added to the measurement record contained in the MDT data.

When receiving the UEInformationResponse message, the radio base station eNB sends the acquired MDT data to the maintenance and monitoring device OAM. Note that the radio base station eNB may interpret the contents of the acquired MDT data and optimize parameters of the radio base station eNB itself.

(1.5) Effects of First Embodiment

As described above, according to the first embodiment, plural measurement triggers can be set in a same radio terminal UE and measurement records can be classified and stored for each measurement trigger. Accordingly, the network can obtain various measurement records classified by measurement trigger in a short period of time. As a result, this can contribute to improving the service quality of the mobile communication system 1.

(1.6) Modification 1 of First Embodiment

In the above-described first embodiment, the radio terminal UE sends the RRCConnectionSetupComplete message containing the log-holing information (Availability Indicator) to the radio base station eNB. In such a method, without knowing for which measurement trigger the radio terminal UE holds the MDT data, the network including the radio base station eNB has difficulty in judging whether or not to collect the MDT data from the radio terminal UE.

For this reason, in the present modification, the radio terminal UE sends an RRCConnectionSetupComplete message containing not only log-holding information indicating that MDT data is held, but also a trigger identifier for each measurement trigger corresponding to the held MDT data.

Figure 8:
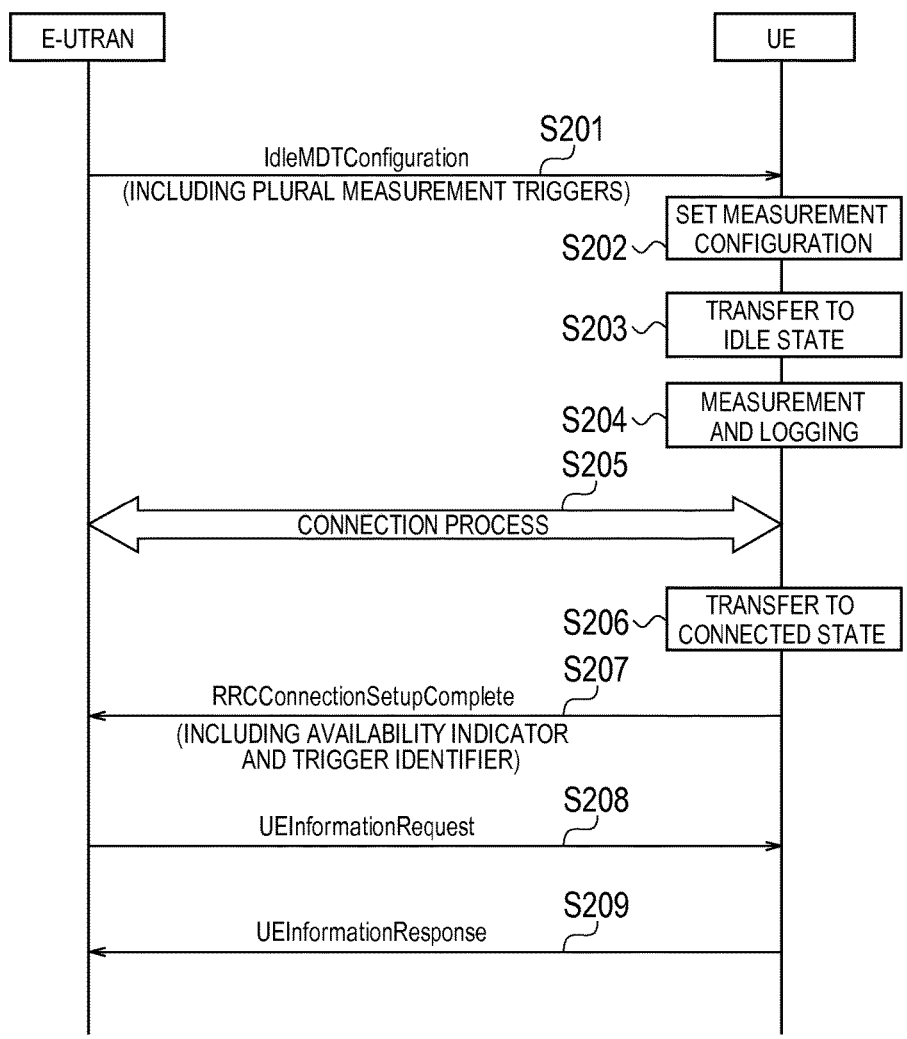
FIG. 8 is a sequence diagram showing a radio measurement collection method according a modification 1 of the first embodiment.

FIG. 8 is a sequence diagram showing a radio measurement collection method according to a modification 1 of the first embodiment. Since the processes at step S201 to step S206 are similar to those in the first embodiment, processes at step S207 and after are described.

As shown in FIG. 8, at step S207, a radio terminal UE sends an RRCConnectionSetupComplete message containing log-holding information (Availability Indicator) and a trigger identifier for each measurement trigger corresponding to the held MDT data to a radio base station eNB. The radio base station eNB receives the RRCConnectionSetupComplete message.

At step S208, the radio base station eNB or a maintenance and monitoring device OAM determines if the MDT data held by the radio terminal UE is collected based on plural trigger identifiers contained in the RRCConnectionSetupComplete message. When it is determined to collect the MDT data, the radio base station eNB sends a UEInformationRequest message to the radio terminal UE. The radio terminal UE receives the UEInformationRequest.

At step S209, the radio terminal UE sends a UEInformationResponse message containing the MDT data to the radio base station eNB. Here, the MDT data is classified by measurement trigger by any of the foregoing storing methods 1 to 3. Specifically, a trigger identifier is added to the measurement record contained in the MDT data.

When receiving the UEInformationResponse message, the radio base station eNB sends the acquired MDT data to the maintenance and monitoring device OAM. Note that the radio base station eNB may interpret the contents of the MDT data and optimize parameters of the radio base station eNB itself.

(1.7) Modification 2 of First Embodiment

In the present modification, a radio terminal UE sends log-holding information indicating that MDT data is held together with a trigger identifier for each measurement trigger corresponding to the held MDT data with being contained in an RRCConnectionSetupComplete message. In addition, when it is determined based on the trigger identifier that the MDT for any of the measurement triggers is collected after receiving the RRCConnectionSetupComplete message containing the log-holding information (Availability Indicator) and the trigger identifier, the radio base station eNB sends a UEInformationRequest message containing a trigger identifier to be collected.

Figure 9:
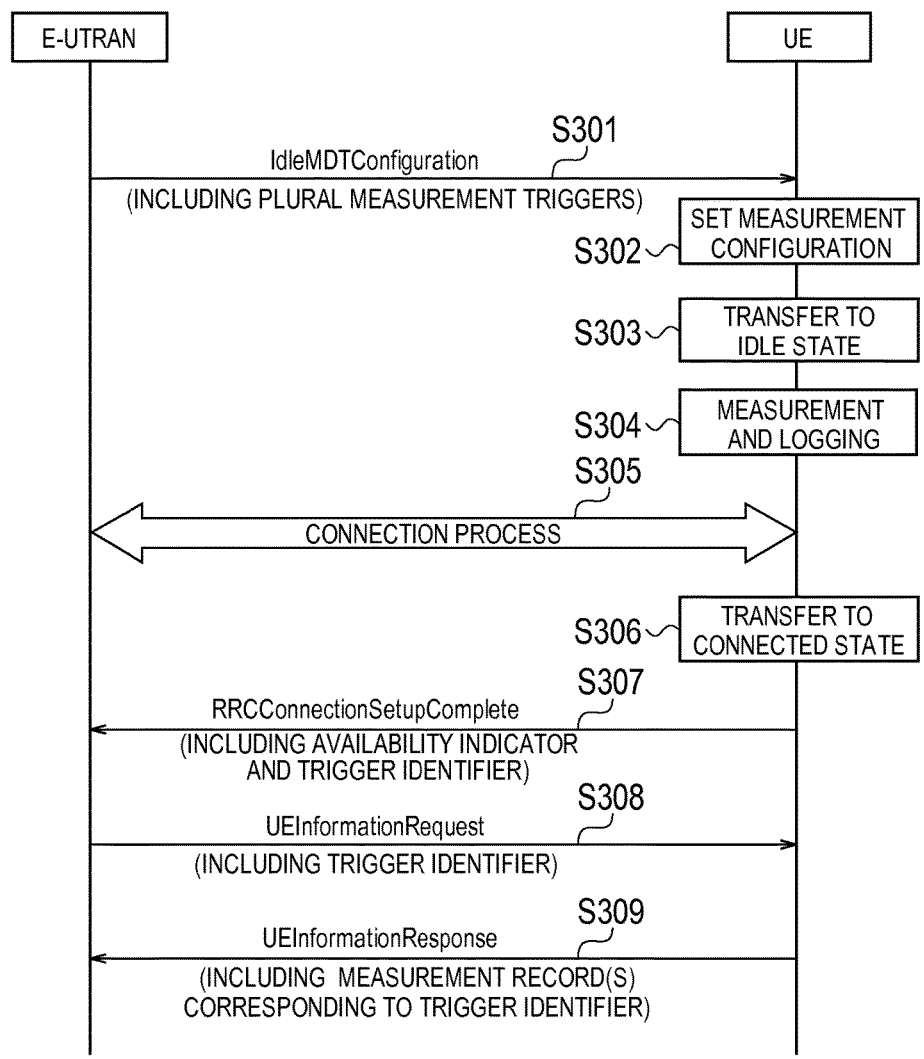
FIG. 9 is a sequence diagram showing a radio measurement collection method according to a modification 2 of the first embodiment.

FIG. 9 is a sequence diagram showing a radio measurement collection method according to a modification 2 of the first embodiment. Since processes at step S301 to step S306 are similar to those in the first embodiment, processes at step S307 and after are described.

As shown in FIG. 9, at step S307, the radio terminal UE sends an RRCConnectionSetupComplete message containing the log-holding information (Availability Indicator) and the trigger identifier for each measurement trigger corresponding to the held MDT data to the radio base station eNB. The radio base station eNB receives the RRCConnectionSetupComplete message.

At step S308, the radio base station eNB sends a UEInformationRequest message containing at least one trigger identifier which is selected (by the network) among plural trigger identifiers contained in the RRCConnectionSetupComplete message to the radio terminal UE. The radio terminal UE receives the UEInformationRequest message.

At step S309, the radio terminal UE extracts each measurement record corresponding to a trigger identifier contained in the UEInformationRequest message from the MDT data and sends a UEInformationResponse message containing the extracted measurement record to the radio base station eNB. Here, a trigger identifier is added to the extracted measurement record.

When receiving the UEInformationResponse message, the radio base station eNB sends the acquired MDT data (the measurement record) to the maintenance and monitoring device OAM. Note that the radio base station eNB may interpret the contents of the MDT data (the measurement record) and optimize parameters of the radio base station eNB itself.

(1.8) Modification 3 of First Embodiment

In the above-described first embodiment and modifications thereof, the description is given to the case where the radio terminal UE stores (logs) MDT data in E-UTRAN and reports the MDT data in the E-UTRAN. However, instead of performing measurement and reporting for a same radio access technology (RAT), the radio terminal UE may record MDT data in a certain RAT and report MDT data in another RAT.

Upon connection with a radio base station based on a RAT different from a RAT for which the MDT data is stored, the radio terminal UE sends an RAT identifier for notifying that the stored MDT data is for the RAT other than the different RAT when sending the radio base station the RRCConnectionSetupComplete message containing the log-holding information (Availability Indicator). For example, the RAT identifier includes 2-bits, and LTE (E-UTRAN) is expressed by "00", UMTS is expressed by "01", and CDMA is expressed by "10". The radio base station having received the RAT identifier can grasp a RAT on which the MDT data stored by the radio terminal UE is based.

(2) Second Embodiment

In a second embodiment, a radio terminal UE which also supports a RAT other than E-UTRAN is used for a logged MDT. In the second embodiment, the description is mainly given to portions different from those of the first embodiment, and duplicated description is omitted. The description is given in the following order of (2.1) Outline of Mobile Communication System, (2.2) Configuration of Radio base station, (2.3) Configuration of Radio Terminal, (2.4) Radio Measurement Collection Method, (2.5) Effects of Second Embodiment, (2.6) Modification 1 of Second Embodiment, (2.7) Modification 2 of Second Embodiment and (2.8) Modification 3 of Second Embodiment.

(2.1) Outline of Mobile Communication System

Figure 10:
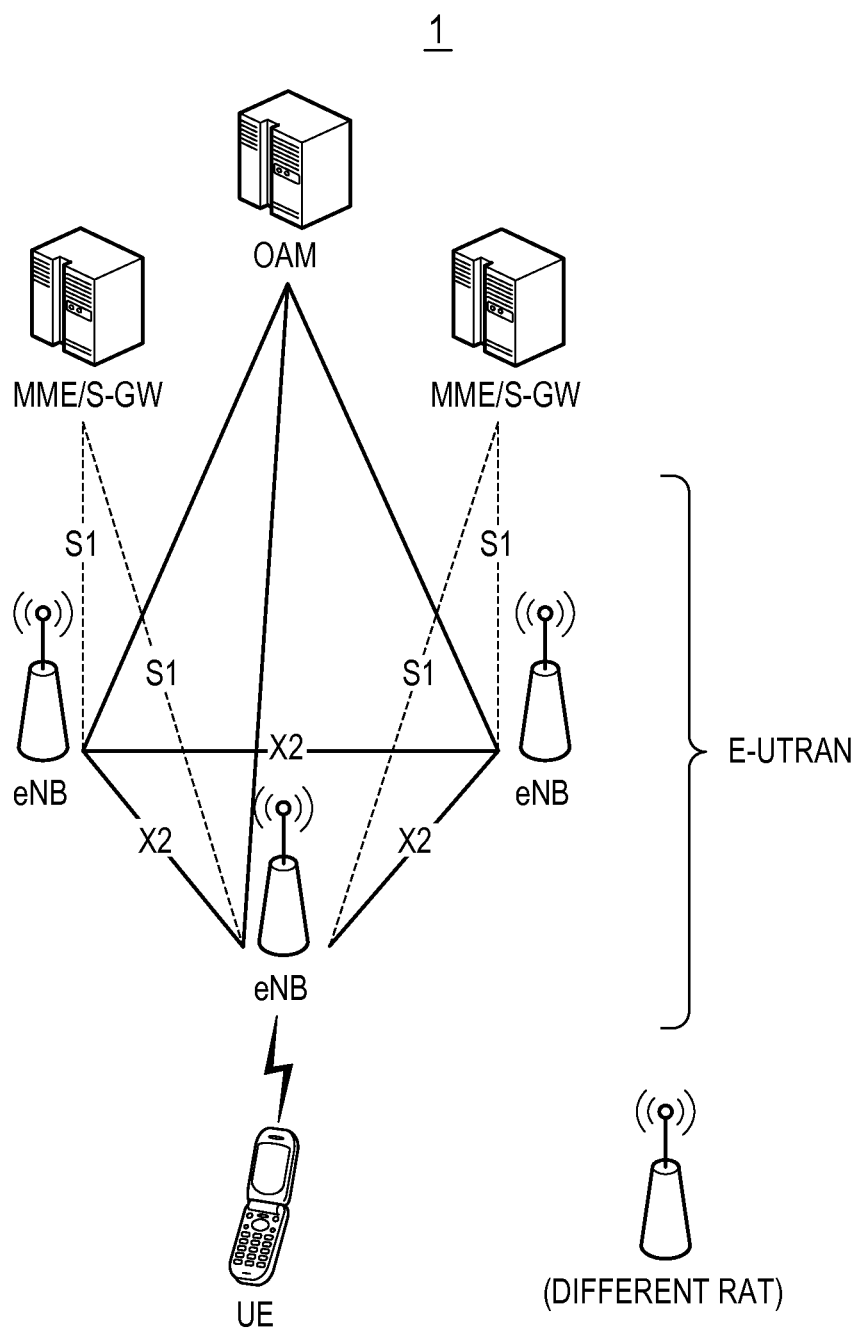
FIG. 10 is a drawing generally showing a schematic configuration of a mobile communication system according to the second embodiment.

FIG. 10 is a diagram generally showing a schematic configuration of a mobile communication system 1 according to the second embodiment.

As shown in FIG. 10, the mobile communication system 1 according to the second embodiment has a radio base station based on a RAT (such as CDMA200) different from E-UTRAN in addition to the system configuration described in the first embodiment.

The radio communication system 1 supports a logged MDT across different RATs (also referred to as Cross RAT measurement).

Firstly, a network sends an IdleMDTConfiguration message which is a measurement configuration message for setting plural measurement configurations for plural RATs to a radio terminal UE in a connected mode. Each measurement configuration contains a measurement target (measurements to be logged), a measurement trigger (triggering of logging event), a measurement duration (total duration of logging), an absolute time (a network absolute time stamp) and a measurement area (measurements area). However, the measurement area (measurements area) does not necessarily have to be contained in the measurement configuration.

Secondly, the radio terminal UE measures a radio environment and stores MDT data containing the measurement result according to the plural measurement configurations for the plural RATs in an idle mode. In the following description, a RAT to be a target of measurement by the radio terminal UE is referred to as a "measurement target RAT".

Thirdly, when the radio terminal UE transfers from an idle mode (an RRC Idle mode) to a connected mode (an RRC connected mode), the radio terminal UE can send a network log-holding information (Availability Indicator) showing that MDT data for the RAT is held (stored) together with log-holding information (Availability Indicator) showing that MDT data for a different RAT is held. Specifically, while holding the MDT data for both of the RAT and the different RAT, the radio terminal UE sends the network an RRCConnectionSetupComplete message indicating the completion of the setting of the connected mode and containing the log-holding information for both of the RATs. However, the radio terminal UE may send a RAT identifier identifying another RAT in place of the log-holding information (1-bit) of another RAT. For example, the RAT identifier is configured of 2-bits, and LTE (E-UTRAN) is expressed by "00", UMTS is expressed by "01", and CDMA is expressed by "10". The radio base station having received the RAT identifier can grasp a RAT on which the MDT data stored by the radio terminal UE is based.

Fourthly, the network sends a UEInformationRequest message which is a request message for requesting the reporting of the MDT data to the radio terminal UE based on the received log-holding information. When receiving the UEInformationRequest message, the radio terminal UE sends a UEInformationResponse message containing the held MDT data to the network.

(2.2) Configuration of Radio Base Station

Referring to FIG. 2 again, a radio base station eNB according to the second embodiment is described mainly about portions different from those of the first embodiment.

When determining to set measurement configurations in a radio terminal UE (selected by a network), a measurement controller 141 creates an IdleMDTConfiguration message containing a measurement configuration (a measurement target, a measurement trigger, a measurement duration, an absolute time, and a measurement area) for each of its own RAT (that is, E-UTRAN) and a different RAT. Then, the measurement controller 141 takes control to cause a radio communication unit 110 to send the IdleMDTConfiguration message to the radio terminal UE.

The collection processor 142 collects MDT data from the radio terminal UE. Specifically, when (the network) determining to collect the MDT data from the radio terminal UE after the radio communication unit 110 receives the RRC-ConnectionSetupComplete message containing the log-holding information (Available Indicator) of its own RAT and/or the different RAT, the collection processor 142 creates a UEInformationRequest message and takes control to cause the radio communication unit 110 to send the created UEInformationRequest message to the radio terminal UE. When the radio communication unit 110 receives a UEInformationResponse message sent (reported) from the radio terminal UE in response to the UEInformationRequest message, the collection processor 142 acquires MDT data for each RAT contained in the received UEInformationResponse message. A RAT identifier identifying a corresponding RAT is added to the MDT data.

After that, the collection processor 142 takes control to cause the network communication unit 120 to send the acquired MDT data to the maintenance and monitoring device OAM. Note that the collection processor 142 may not only send the MDT data to the maintenance and monitoring device OAM but also interpret the contents of the MDT data and optimize parameters of the radio base station eNB itself.

(2.3) Configuration of Radio Terminal

Referring to FIG. 3 again, the radio terminal UE according to the second embodiment is described mainly for portions different from those of the first embodiment.

When the radio communication unit 210 receives an IdleMDTConfiguration message, the configuration setting unit 261 sets plural measurement configurations for plural measurement target RATs contained in the received IdleMDTConfiguration message (in other words, stores in the storage unit 250) in the connected mode. Also, the configuration setting unit 261 activates a timer for a measurement duration (duration timer) when each measurement configuration is set.

The logging processor 262 measures a radio environment and acquires location information and time information (time stamp) for each measurement configuration stored in the storage unit 250, and also stores (in other words, stores in the storage unit 250) the MDT data containing the measurement result, the location information, and the time stamp for each of the plural measurement target RATs. In the second embodiment, the logging processor 262 performs measurement for the plural measurement target RATs every time an event corresponding to a measurement trigger (triggering of logging event) occurs.

The logging processor 262 measures a radio environment for each of the plural measurement target RATs and stores the measurement result in association with the measurement target RAT corresponding to the measurement result according to any of the following storing methods 1 to 3. In the following description, a set of the measurement result obtained by one time measurement and location information and a time stamp when the measurement is conducted is referred to as a "measurement record". The MDT data is a collection of plural measurement records.

Figure 11:
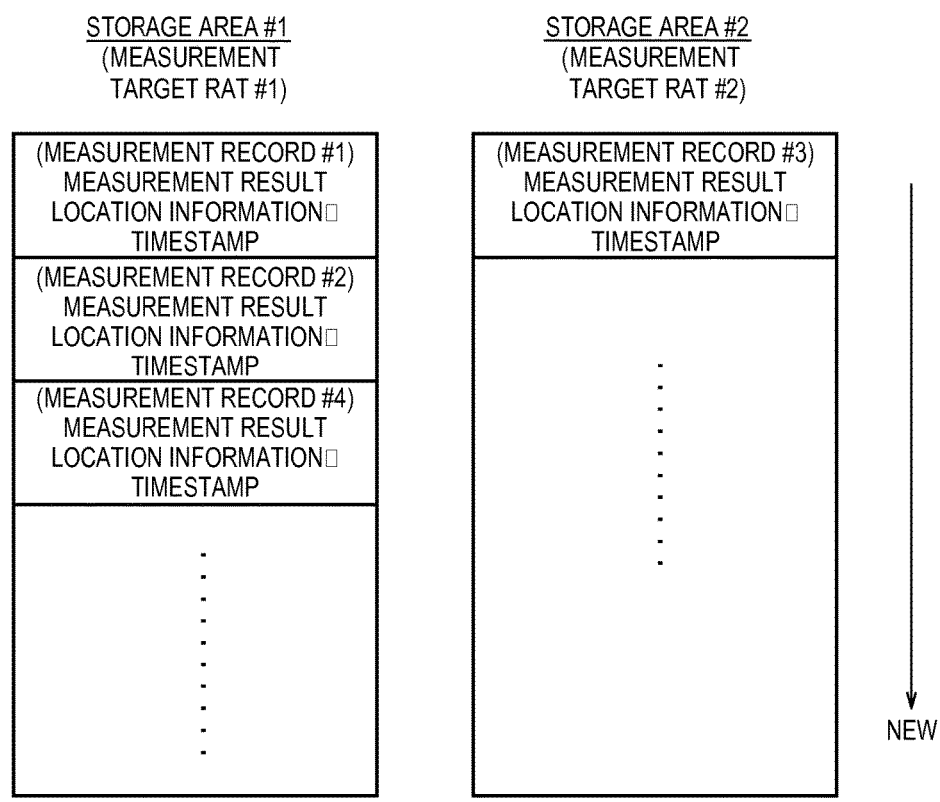
FIG. 11 is a conceptual diagram for illustrating a storing method 1 according to the second embodiment.

FIG. 11 is a conceptual diagram for illustrating a storing method 1 according to the second embodiment.

As shown in FIG. 11, the logging processor 262 reserves a storing area inside the storage unit 250 for each of the plural measurement target RATs. Specifically, the logging processor 262 reserves a storage area #1 for a measurement target RAT #1 (for example, E-UTRAN) and reserves a storage area #2 for a measurement target RAT #2 (for example, CDMA2000).

After that, when the measurement for the measurement target RAT #1 is conducted, the logging processor 262 stores a measurement record containing the measurement result, the location information, and the time stamp in the storage area #1. In FIG. 11, the logging processor 262 stores a measurement record #1, a measurement record #2, and a measurement record #4 for the measurement target RAT #1 in the storage area #1.

Also, when the measurement for the measurement target RAT #2 is conducted, the logging processor 262 stores a measurement record containing the measurement result, the location information, and the time stamp in the storage area #2. In FIG. 11, the logging processor 262 stores the measurement record #3 for the measurement target RAT #2 in the storage area #2.

FIG. 12 is a conceptual diagram for illustrating a storing method 2 according to the second embodiment.

As shown in FIG. 12, the logging processor 262 reserves a same storage area for plural measurement target RATs and adds a RAT identifier indicating a measurement target RAT to each measurement record as a header.

In FIG. 12, the logging processor 262 adds a RAT identifier #1 showing the measurement target RAT #1 as a header to each of the measurement record #1, the measurement record #2, and the measurement record #4 for the measurement target RAT #1. Also, the logging processor 262 adds a RAT identifier #2 showing the measurement target RAT #2 as a header to the measurement record #3 for the measurement target RAT #2.

Figure 13:
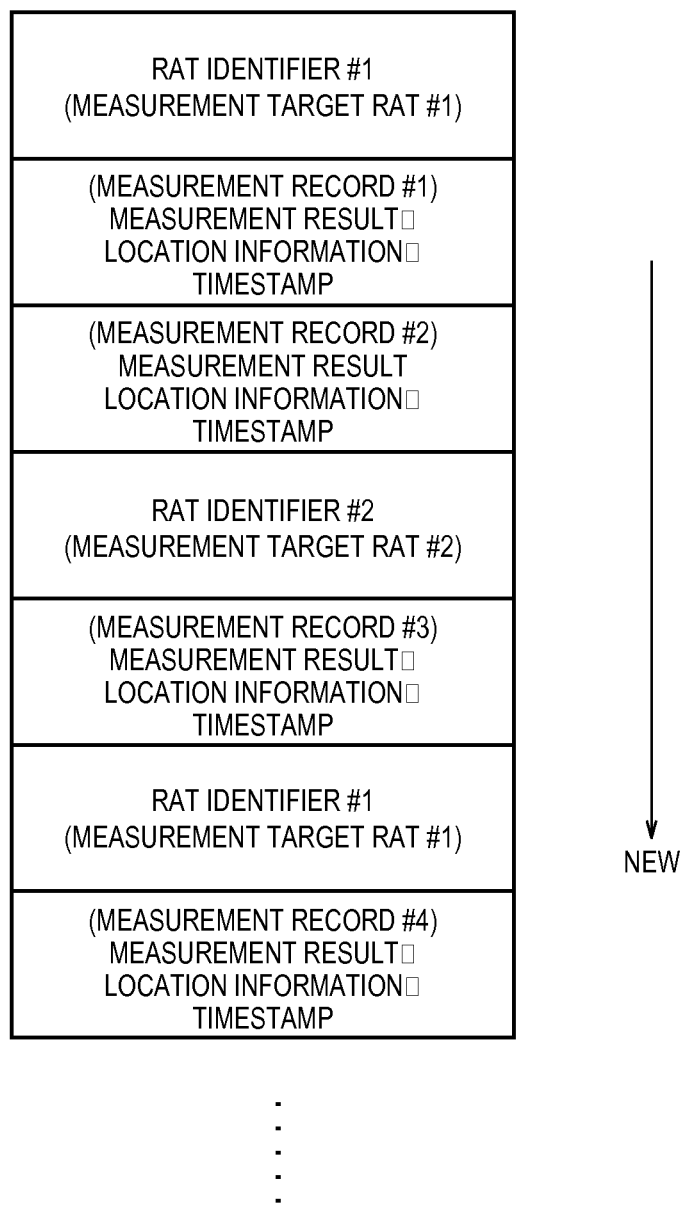
FIG. 13 is a conceptual diagram for illustrating a storing method 3 according to the second embodiment.

FIG. 13 is a conceptual diagram for illustrating a storing method 3 according to the second embodiment.

As shown in FIG. 13, the logging processor 262 reserves a same storage unit for plural measurement target RATs and adds one RAT identifier indicating the measurement target RAT to plural measurement records. Specifically, when the measurement records for the same measurement target RAT are continuously obtained, the logging processor 262 adds one RAT identifier to the continued measurement records. After that, the logging processor 262 inserts the RAT identifier between the measurement records when the measurement record for a different measurement target RAT is obtained.

In FIG. 13, the logging processor 262 adds a RAT identifier #1 indicating the measurement target #1 before the measurement record #1 when the measurement record #1 for the measurement target RAT #1 is obtained, and, thereafter, stores the measurement record #2 after the measurement record #1 when the measurement record #2 for the measurement target RAT #1 is obtained.

Then, when a measurement target #3 for the measurement target RAT #2 is obtained, the logging processor 262 inserts a RAT identifier #2 indicating the measurement target RAT #2 between the measurement record #2 and the measurement record #3. After that, when a measurement record #4 for the measurement target RAT #1 is obtained, the logging processor 262 inserts the RAT identifier #1 indicating the measurement target RAT #1 between the measurement record #3 and the measurement record #4.

Referring to FIG. 3 again, the configuration setting unit 261 performs measurement only when camping (being stand-by) in a designated cell ID or a tracking area in a case where a measurement area (measurements area) is designated. Also, the logging processor 262 terminates the storing of MDT data when the timer for a measurement duration (duration timer) expires.

Note that when the timer for a measurement duration (duration timer) expires, the configuration setting unit 261 erases the measurement configuration. Furthermore, when a new measurement configuration is set by receiving a new measurement configuration message from the network while the measurement configuration and the MDT data are held, the configuration setting unit 261 replaces the measurement configuration with the new measurement configuration and erases the held MDT data.

When the idle mode is transferred to the connected mode while the MDT data is held in the storage unit 250, the reporting processor 263 takes control to cause the radio communication unit 210 to send an RRCConnectionSetupComplete message indicating the completion of the transfer from the idle mode to the connected mode and containing the log-holding information indicating that the MDT data is held. However, when the MDT data for a RAT in a connection destination is held, the reporting processor 263 takes control to send log-holding information indicating that the MDT data for the RAT in the connection destination is held. Also, when the MDT data for a RAT other than the RAT in the connection destination is held, the reporting processor 263 takes control to send second log-holding information indicating that the MDT data for a RAT other than the RAT in the connection destination is held. Note that the reporting processor 263 may take control to send a RAT identifier identifying a RAT other than the RAT in the connection destination in place of the second log-holding information.

When the radio communication unit 210 receives the UEInformationRequest message, the reporting processor 263 acquires the MDT data from the storage unit 250 in the connected mode. The MDT data is classified by measurement target RAT by any of the foregoing storing methods 1 to 3. Specifically, a RAT identifier is added to the MDT data (or the measurement record). Note that in a case where transmission of MDT data is requested from a radio base station based on a RAT other than E-UTRAN, a message having a name other than the UEInformationRequest message may be used. In the following description, a message to be used for requesting transmission of the MDT data is simply referred to as an InformationRequest message.

Then, the reporting processor 236 creates a UEInformationResponse message containing the acquired MDT data. Note that in a case where the MDT data is sent to a radio base station based on a RAT other than E-UTRAN, a massage having a name different from the UEInformationResponse message may be used. In the following description, a message to be used for transmission of the MDT data is simply referred to as an InformationResponse message.

Then, the reporting processor 263 takes control to cause the radio communication unit 210 to send the created InformationResponse message to the network (the radio base station). After the MDT data is reported as described above, the reporting processor 263 erases the MDT data stored in the storage unit 250.

(2.4) Radio Measurement Collection Method

Figure 14:
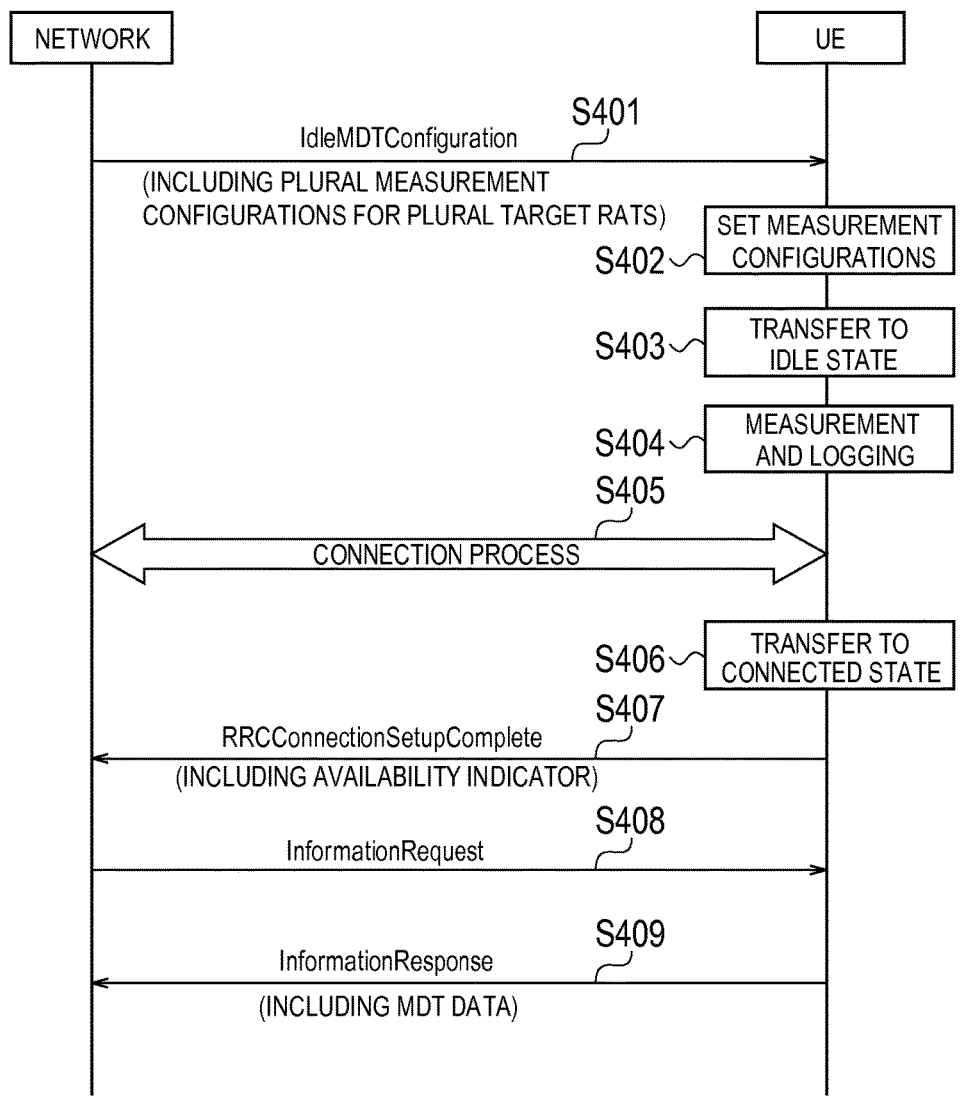
FIG. 14 is a sequence diagram showing a radio measurement collection method according to the second embodiment.

FIG. 14 is a sequence diagram showing a radio measurement collection method according to the second embodiment.

As shown in FIG. 14, at step S401, a radio base station eNB included in E-UTRAN sends an IdleMDTConfiguration message including plural measurement configurations for plural measurement target RATs to a radio terminal UE in a connected mode. The radio terminal UE receives the IdleMDTConfiguration message.

At step S402, the radio terminal UE sets each measurement configuration contained in the received IdleMDTConfiguration message in the radio terminal UE itself.

At step S403, the radio terminal UE transfers from the connected mode to the idle mode.

At step S404, the radio terminal UE measures a radio environment for each of the plural measurement target RATs and stores the measurement record containing the measurement result in association with the measurement target RAT according to any of the foregoing storing methods 1 to 3. In other words, MDT data containing the measurement record is classified by measurement target RAT by any of the foregoing storing methods 1 to 3.

At step S404, the radio terminal UE connects with a radio base station eNB included in E-UTRAN or a radio base station in a RAT other than the E-UTRAN.

At step S406, the radio terminal UE transfers from the idle mode to the connected mode.

At step S407, the radio terminal UE sends an RRCConnectionSetupComplete message containing log-holding information (Availability Indicator) to the radio base station. Specifically, when the MDT data for a RAT in a connection destination is held, the radio terminal UE sends first log-holding information indicating that the MDT data for a RAT in a connection destination is held to the radio base station. Also, when the MDT data for a RAT other than the RAT in the connection destination is held, the radio terminal UE sends second log-holding information indicating that the MDT data for a RAT other than the RAT in the connection destination is held to the radio base station. Note that the radio terminal UE may send a RAT identifier identifying a RAT other than the RAT in the connection destination in place of the second log-holding information. The radio base station receives the RRCConnectionSetupComplete message.

At step S408, the radio base station sends an InformationRequest message to the radio terminal UE when the MDT data is collected from the radio terminal UE. The radio terminal UE receives the InformationRequest message.

At step S409, the radio terminal UE sends an InformationResponse message containing the MDT data for each measurement target RAT to the radio base station. Specifically, a RAT identifier indicating a corresponding RAT is added to the MDT data for each measurement target RAT.

When having received the InformationResponse message, the radio base station sends the acquired MDT data to the maintenance and monitoring device OAM. Note that the radio base station may interpret the contents of the MDT data and optimize parameters of the radio base station itself.

(2.5) Effects of Second Embodiment

As described above, according to the second embodiment, the measurement record can be classified and stored for each measurement target RAT. Accordingly, various measurement records which are classified by measurement target RAT can be obtained in a short period of time. As a result, this can contribute to improving a service quality of the radio communication system 1 in a short period of time.

(2.6) Modification 1 of Second Embodiment

In the present modification, the description is given of a case where the network can acquire MDT data by designating a RAT.

Figure 15:
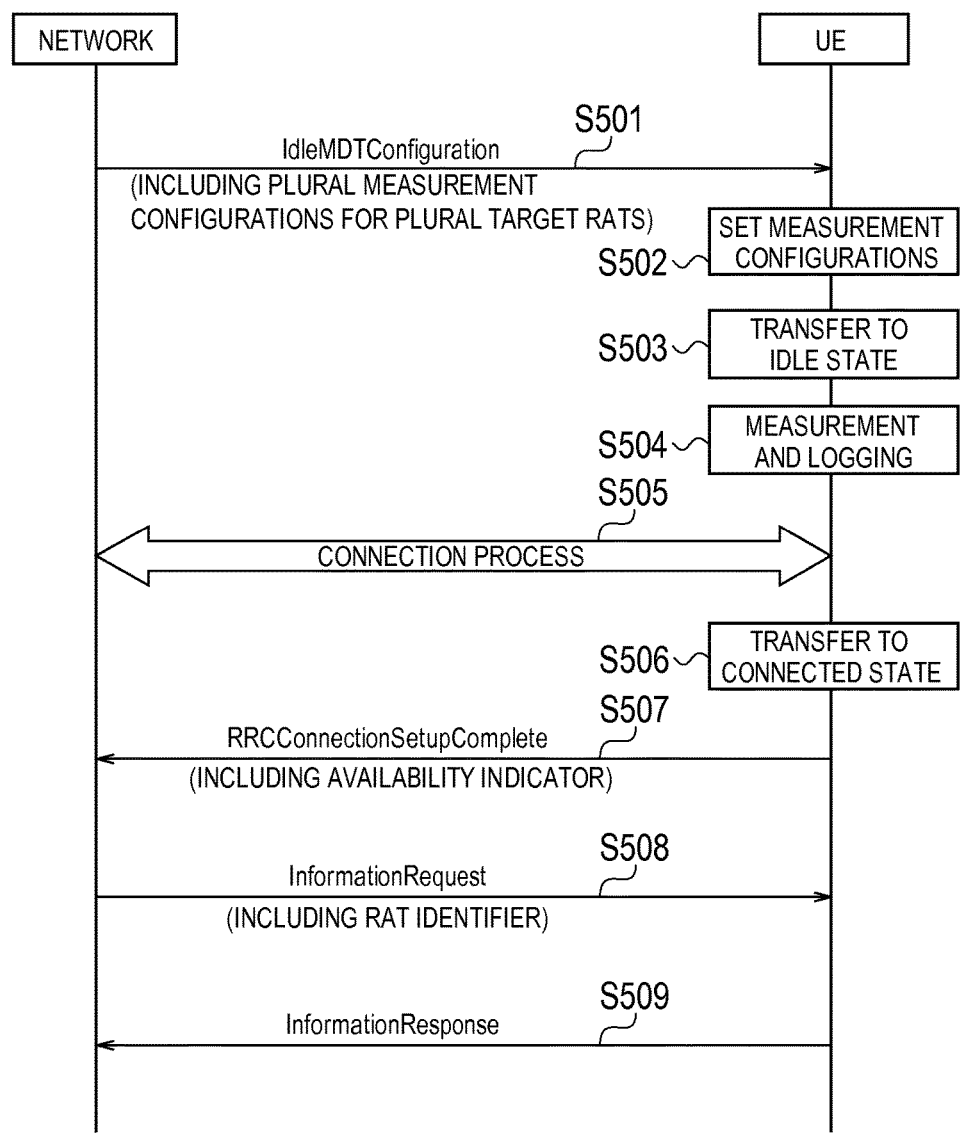
FIG. 15 is a sequence diagram showing a radio measurement collection method according to a modification 1 of the second embodiment.

FIG. 15 is a sequence diagram showing a radio measurement collection method according to a modification 1 of the second embodiment. Since processes at step S501 to step S506 are similar to those of the second embodiment, processes at step S507 and after are described.

As shown in FIG. 15, at step S507, a radio terminal UE sends an RRCConnectionSetupComplete message containing log-holding information (Availability Indicator) to a radio base station. Specifically, when MDT data for a RAT in a connection destination is held, the radio terminal UE sends the radio base station first log-holding information indicating that MDT data for the RAT in the connection destination is held. Also, when the MDT data for a RAT other than the RAT in the connection destination is held, the radio terminal UE sends the radio base station second log-holding information indicating that the MDT data for a RAT other than the RAT in the connection destination is held. Note that the radio terminal UE may sends the radio base station a RAT identifier identifying a RAT other than the RAT in the connection destination in place of the second log-holding information. The radio base station receives the RRCConnectionSetupComplete message.

At step S508, the radio base station or the maintenance and monitoring device OAM selects a RAT for the MDT data to be collected based on the log-holding information contained in the RRCConnectionSetupComplete message or a RAT identifier, and creates an InformationRequest message containing a RAT identifier identifying the selected RAT. The radio base station sends the InformationRequest message to the radio terminal UE. The radio terminal UE receives the InformationRequest message.

At step S509, the radio terminal UE extracts MDT data (or the measurement record) for the RAT identifier contained in the InformationRequest message and sends the radio base station an InformationResponse message containing the extracted MDT data. Here, the MDT data is classified by measurement target RAT by any of the foregoing methods 1 to 3. Specifically, a RAT identifier is added to the MDT data (or the measurement record).

When receiving the InformationResponse message, the radio base station acquires and sends the MDT data contained in the InformationResponse message to the maintenance and monitoring device OAM. Note that the radio base station may interpret the contents of the MDT data and optimize parameters of the radio base station eNB itself.

(2.7) Modification 2 of Second Embodiment

In the above-described second embodiment, the radio base station eNB sends the radio terminal UE the IdleMDTConfiguration message containing the plural measurement configurations for the plural the measurement target RATS. In the present modification, a radio base station eNB sends the radio terminal UE an IdleMDTConfiguration message containing one measurement configuration for its own RAT (in other words, E-UTRAN). Also, the radio terminal UE measures a radio environment for another measurable RAT at the same time when a radio environment for E-UTRAN is measured and stores the measurement result for each RAT.

Figure 16:
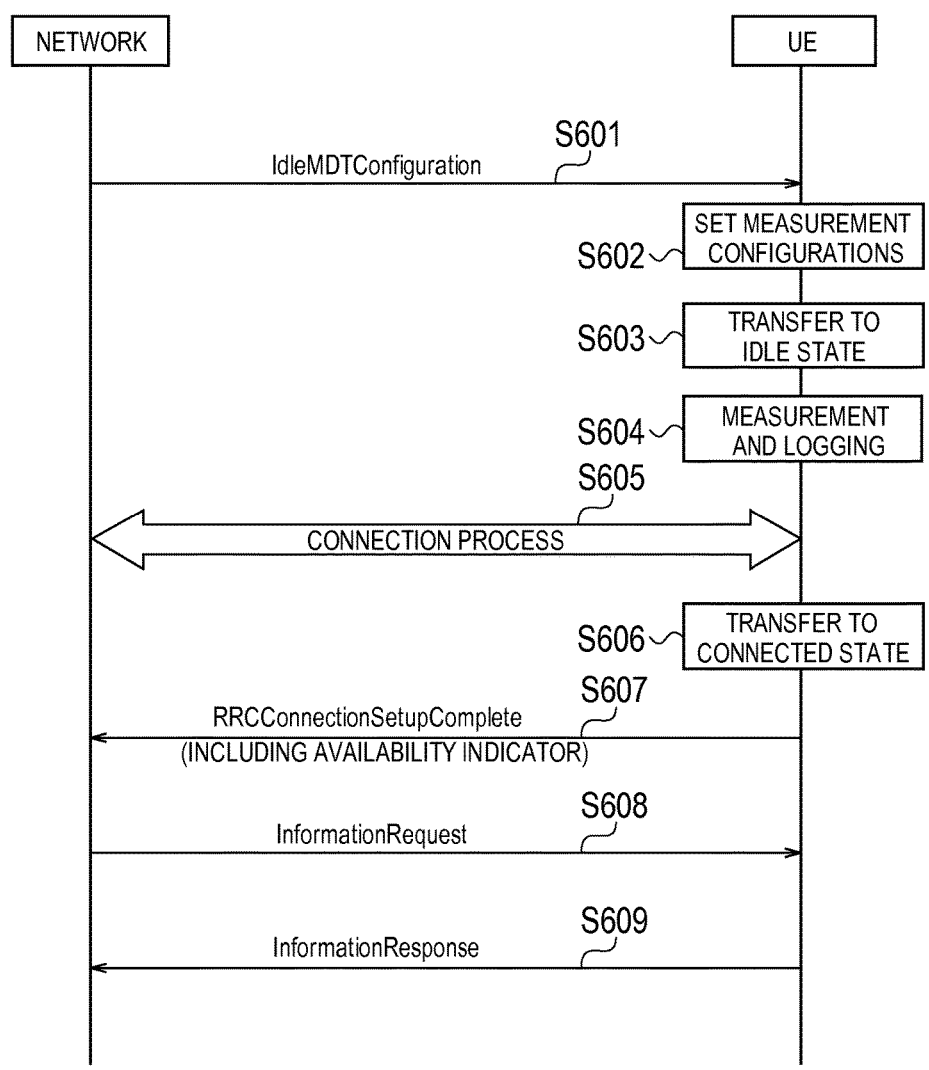
FIG. 16 is a sequence diagram showing a radio measurement collection method according to a modification 2 of the second embodiment.

FIG. 16 is a sequence diagram showing a radio measurement collection method according to a modification 2 of the second embodiment.

As shown in FIG. 16, at step S601, a radio base station eNB included in E-UTRAN sends an IdleMDTConfiguration message containing one measurement configuration for the local RAT to a radio terminal UE in a connected mode. The radio terminal UE receives the IdleMDTConfiguration message.

At step S602, the radio terminal UE sets the measurement configuration contained in the received IdleMDTConfiguration message in the radio terminal UE itself.

At step S603, the radio terminal UE transfers from the connected mode to the idle mode.

At step S604, the radio terminal UE measures a radio environment for each of the plural measurement target RATs. Specifically, the radio terminal UE measures a radio environment for another measurable RAT when the radio environment for E-UTRAN is measured and stores the measurement result for each RAT. The radio terminal UE stores the measurement record containing the measurement result in association with the measurement target RAT according to any of the foregoing storing methods 1 to 3. In other words, the MDT data containing the measurement record is classified by measurement target RAT by any of the foregoing storing methods.

At step S605, the radio terminal UE connects with the radio base station eNB contained in E-UTRAN or the radio base station based on a RAT other than E-UTRAN.

At step S606, the radio terminal UE transfers from the idle mode to the connected mode.

At step S307, the radio terminal UE sends the radio base station an RRCConnectionSetupComplete message containing log-holding information (Availability Indicator). Specifically, when the MDT data for a RAT in a connection destination is held, the radio terminal UE sends the radio base station first log-holding information indicating that the MDT data for the RAT in the connection destination is held. Also, when the MDT data for a RAT other than the RAT in the connection destination is held, the radio terminal UE sends the radio base station second log-holding information indicating that the MDT data for a RAT other than the RAT in the connection destination is held. Note that the radio terminal UE may send the radio base station a RAT identifier identifying a RAT other than the RAT in the connection destination in place of the second log-holding information. The radio base station receives the RRCConnectionSetupComplete message.

At step S608, the radio base station sends an InformationRequest message to the radio terminal UE when MDT data is collected from the radio terminal UE. The radio terminal UE receives the InformationRequest message.

At step S609, the radio terminal UE sends an InformationResponse message containing the MDT data for each measurement target RAT to the radio base station. Specifically, a RAT identifier indicating a corresponding RAT is added to the MDT data for each measurement target RAT.

When receiving the InformationResponse message, the radio base station sends the acquired MDT data to the maintenance and monitoring device OAM. Note that the radio base station may interpret the contents of the MDT data and optimize parameters of the radio base station itself.

(2.8) Modification 3 of Second Embodiment

Figure 17:
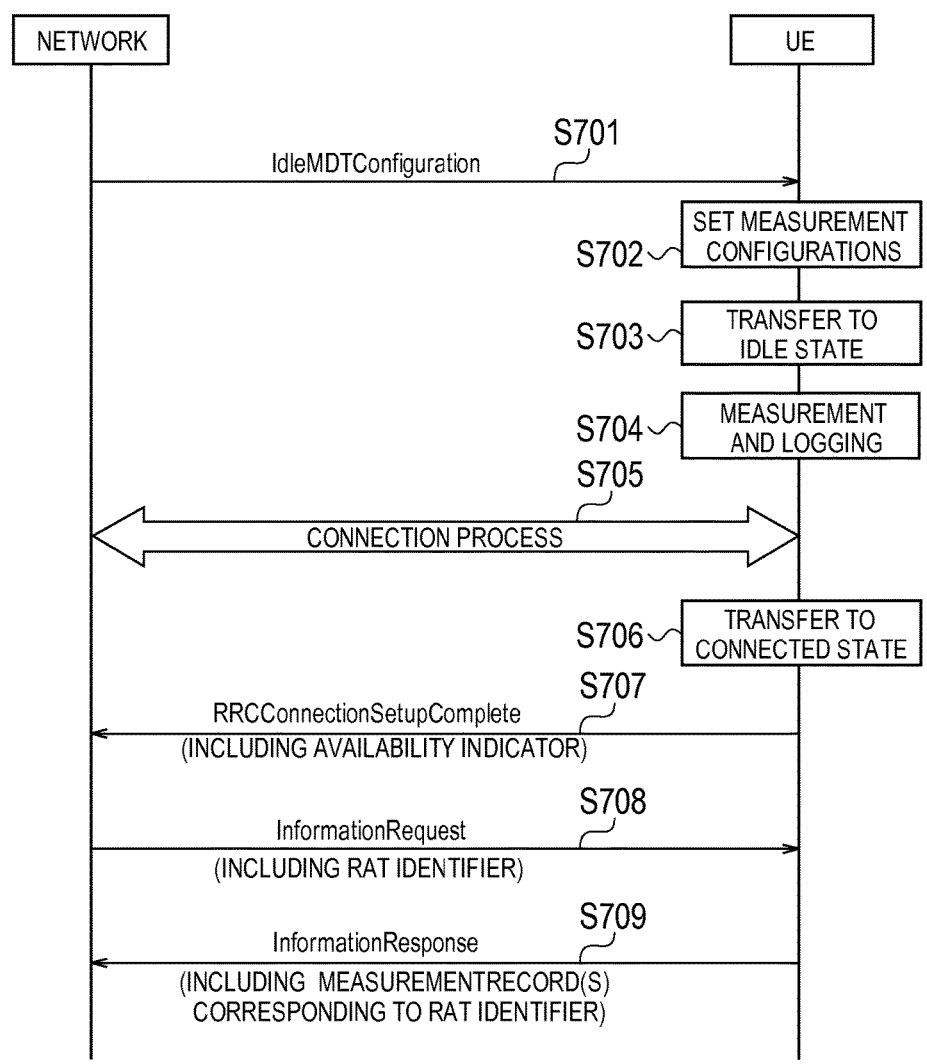
FIG. 17 is a sequence diagram showing a radio measurement collection method according to a modification 3 of the second embodiment.

FIG. 17 is a sequence diagram showing a radio measurement collection method according a modification 3 of the second embodiment.

As shown in FIG. 17, at step S701, a radio base station eNB included in E-UTRAN sends an IdleMDTConfiguration message containing one measurement configuration for its own RAT to a radio terminal UE in a connected mode. The radio terminal UE receives the IdleMDTConfiguration message.

At step S702, the radio terminal UE sets the measurement configuration contained in the received IdleMDTConfiguration message in the radio terminal UE itself.

At step S703, the radio terminal UE transfers from the connected mode to an idle mode.

At step S704, the radio terminal UE measures a radio environment for each of plural measurement target RATs. Specifically, the radio terminal UE measures a radio environment for another measurable RAT when the radio environment for E-UTRAN is measured and stores the measurement result for each RAT. The radio terminal UE stores the measurement record containing the measurement result in association with the measurement target RAT according to any of the foregoing storing methods 1 to 3. In other words, the MDT data containing the measurement record is classified by measurement target RAT by any of the foregoing storing methods 1 to 3.

At step S705, the radio terminal UE connects with the radio base station eNB included in E-UTRAN or the radio base station in a RAT other than E-UTRAN.

At step S706, the radio terminal UE transfers from the idle mode to the connected mode.

At step S707, the radio terminal UE sends an RRCConnectionSetupComplete message containing log-holding information (Availability Indicator) to the radio base station. Specifically, when the MDT data for a RAT in a connection destination is held, the radio terminal UE sends the radio base station first log-holding information indicating that the MDT data for the RAT in the connection destination is held. Also, when the MDT data for a RAT other than the RAT in the connection destination is held, the radio terminal UE sends the radio base station second log-holding information indicating that the MDT data for a RAT other than the RAT in the connection destination is held. Note that the radio terminal UE may send the radio base station a RAT identifier identifying a RAT other than the RAT in the connection destination in place of the second log-holding information. The radio base station receives the RRCConnectionSetupComplete message.

At step S708, the radio base station or the maintenance and monitoring device OAM selects a RAT whose MDT data is a collection target based on the log-holding information contained in the RRCConnectionSetupComplete message or the RAT identifier and creates an InformationRequest message containing the RAT identifier identifying the selected RAT. The radio base station sends the InformationRequest message to the radio terminal UE. The radio terminal UE receives the InformationRequest message.

At step S709, the radio terminal UE extracts MDT data (or measurement record) corresponding to the RAT identifier contained in the InformationRequest message and sends an InformationResponse message containing the extracted MDT data to the radio base station. Here, the MDT data is classified by measurement target RAT by any of the foregoing storing methods 1 to 3. Specifically, a RAT identifier is added to the MDT data (or the measurement record).

When receiving the InformationResponse message, the radio base station acquires and sends the MDT data contained in the InformationResponse message to the maintenance and monitoring device OAM. Note that the radio base station may interpret the contents of the MDT data and optimize parameters of the radio base station eNB itself.

(3) Other Embodiments

As described above, the present invention has been described by the embodiments. However, it should not be understood that the description and drawings which constitute this disclosure limit the invention. Various alternative embodiments, examples, and operational techniques will be apparent from this disclosure for those skilled in the art.

For example, the first and second embodiments may be implemented together instead of being implemented separately.

Also, in the first and second embodiments, the description is mainly given to a mobile communication system which is configured based on LTE (Long Term Evolution)-Advanced whose specifications are formulated by the 3GPP. However, the present invention can be applied to a mobile communication system or the like which is configured based on not only the LTE-Advanced but also W-CDMA (Wideband Code Division Multiple Access).

As described above, it should be understood that the present invention contains various embodiments which are not described herein. Accordingly, the present invention is only limited by the scope of claims and matters specifying the invention, which are appropriate from this disclosure.

Note that the entire content of the U.S. provisional application No. 61/385,079 (filed on Sep. 21, 2010) is incorporated herein by reference.

INDUSTRIAL APPLICABILITY

As described above, the radio measurement collection method and the radio terminal according to the present invention are useful for radio communication such as mobile communication, by which the various measurement results can be obtained in a short period of time.

The invention claimed is:

1. A radio measurement collection method, comprising the steps of:
sending a Minimization of Drive Test (MDT) configuration specific to a first radio access technology (RAT) to a radio terminal in a connected mode, from a radio base station of the first RAT;
measuring a radio environment for not only the first RAT but also a second RAT by the radio terminal in an idle mode even when the MDT configuration only configures measurement for the first RAT and the MDT configuration does not include area information to be measured; and
storing, by the radio terminal in the idle mode, a measurement result of not only the first RAT but also the second RAT with a location information and a time stamp, to report the measurement result to a network.

2. The radio measurement collection method according to claim 1, further comprising the step of reserving a storage area for each of a plurality of RATs, wherein
in the storing step, the measurement result is stored in a corresponding storage area.

3. The radio measurement collection method according to claim 1, wherein the storing step includes the step of adding a RAT identifier to each measurement result, the RAT identifier indicating a RAT corresponding to the measurement result.

4. The radio measurement collection method according to claim 1, wherein when a plurality of measurement results are obtained for one RAT, the storing step includes the step of adding one RAT identifier indicating the one RAT to each of the plurality of measurement results.

5. The radio measurement collection method according to claim 1, further comprising the steps of:
sending a request message requesting transmission of the measurement result from the network to the radio terminal after the radio terminal transfers from the idle mode to the connected mode; and
sending the measurement result and a RAT identifier from the radio terminal to the network in response to the request message from the network, the RAT identifier indicating a RAT corresponding to the measurement result.

6. The radio measurement collection method according to claim 1, further comprising the step of sending, from the radio terminal to the network, information indicating that a measurement result is stored and a RAT identifier indicating a RAT corresponding to the measurement result, when the radio terminal transfers from the idle mode to the connected mode.

7. The radio measurement collection method according to claim 1, further comprising the step of sending, from the radio terminal to the network, information indicating that the measurement result is stored for each of the plurality of RATs, when the radio terminal transfers from the idle mode to the connected mode.

8. The radio measurement collection method according to claim 1, further comprising the steps of:
sending a request message containing a RAT identifier indicating a RAT from the network to the radio terminal, after the radio terminal transfers from the idle mode to the connected mode; and
sending, from the radio terminal to the network, the measurement result corresponding to the RAT identifier contained in the request message from the network.

9. A radio terminal, comprising:
a receiver that receives a Minimization of Drive Test (MDT) configuration specific to a first radio access technology (RAT) from a radio base station of the first RAT, in a connected mode; and
a controller that:
in an idle mode, measures a radio environment for not only the first RAT but also a second RAT even when the MDT configuration only configures measurement for the first RAT and the MDT configuration does not include area information to be measured, and
in the idle mode, stores each measurement result of not only the first RAT but also the second RAT with a location information and a time stamp, to report the measurement result to a network.

10. A radio measurement collection method, comprising the steps of:
sending a Minimization of Drive Test (MDT) configuration specific to a first radio access technology (RAT) to a radio terminal in a connected mode, from a radio base station of the first RAT;
measuring a radio environment for not only the first RAT but also a second RAT by the radio terminal in an idle mode even when the MDT configuration only configures measurement for the first RAT and the MDT configuration does not include area information to be measured;
storing, by the radio terminal in the idle mode, a measurement result of not only the first RAT but also the second RAT with a location information and a time stamp, to report the measurement result to a network;
sending, from the radio terminal to the network, log storing information indicating that the measurement result is stored, when the radio terminal transfers from the idle mode to the connected mode;
sending a request message requesting transmission of the measurement result from the network to the radio terminal based on the log storing information; and
sending the measurement result obtained for each of the RATs and a RAT identifier for each of the RATs from the radio terminal to the network in response to the request message from the network.

11. A radio terminal, comprising:
a receiver that receives a Minimization of Drive Test (MDT) configuration specific to a first radio access technology (RAT) from a radio base station of the first RAT, in a connected mode; and
a controller that:
in an idle mode, measures a radio environment for not only the first RAT but also a second RAT even when the MDT configuration only configures measurement for the first RAT and the MDT configuration does not include area information to be measured,
in the idle mode, stores each measurement result of not only the first RAT but also the second RAT with a location information and a time stamp, to report the measurement result to a network,
sends, to the network, log storing information indicating that the measurement result is stored, when the radio terminal transfers from the idle mode to the connected mode;
sends the measurement result obtained for each of the RATs and a RAT identifier for each of the RATs to the network in response to the request message transmitted from the network based on the log storing information.

12. A processor provided in a radio terminal, configured to:
receive a Minimization of Drive Test (MDT) configuration specific to a first radio access technology (RAT) from a radio base station of the first RAT, in a connected mode;
in an idle mode, measure a radio environment for not only the first RAT but also a second RAT even when the MDT configuration only configures measurement for the first RAT and the MDT configuration does not include area information to be measured; and
in the idle mode, store each measurement result of not only the first RAT but also the second RAT with a location information and a time stamp, to report the measurement result to a network.

* * * * *